(12) United States Patent
Naruse et al.

(10) Patent No.: US 7,727,451 B2
(45) Date of Patent: Jun. 1, 2010

(54) SEALING METHOD OF HONEYCOMB MOLDED BODY, AND METHOD FOR MANUFACTURING CELL-SEALED HONEYCOMB FIRED BODY

(75) Inventors: Kazuya Naruse, Courtenay (FR); Syuhei Hayakawa, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 146 days.

(21) Appl. No.: 11/746,895

(22) Filed: May 10, 2007

(65) Prior Publication Data

US 2008/0116601 A1 May 22, 2008

Related U.S. Application Data

(63) Continuation of application No. PCT/JP2006/309825, filed on May 17, 2006.

(51) Int. Cl.
B29C 59/02 (2006.01)
C04B 33/32 (2006.01)

(52) U.S. Cl. .................... 264/296; 264/630

(58) Field of Classification Search ........... 264/630, 264/631
See application file for complete search history.

(56) References Cited

U.S. PATENT DOCUMENTS

| | | | | |
|---|---|---|---|---|
| 2,303,888 | A | * 12/1942 | Miller | 264/148 |
| 3,904,551 | A | * 9/1975 | Lundsager et al. | 502/241 |
| 4,293,357 | A | 10/1981 | Higuchi et al. | |
| 4,573,896 | A | 3/1986 | Bonzo | |
| 5,021,204 | A | 6/1991 | Frost et al. | |
| 5,914,187 | A | 6/1999 | Naruse et al. | |
| 6,669,751 | B1 | 12/2003 | Ohno et al. | |
| 6,809,139 | B2 * | 10/2004 | Fabian et al. | 524/430 |
| 7,112,233 | B2 | 9/2006 | Ohno et al. | |
| 7,309,370 | B2 | 12/2007 | Kudo et al. | |
| 7,332,014 | B2 | 2/2008 | Ono et al. | |

(Continued)

FOREIGN PATENT DOCUMENTS

EP    1640068 A1 *  3/2006

(Continued)

OTHER PUBLICATIONS

Extended European Search Report on EP 07005685.8, Jul. 24, 2007.

*Primary Examiner*—Steven P Griffin
*Assistant Examiner*—Erin Snelting
(74) *Attorney, Agent, or Firm*—Ditthavong Mori & Steiner, P.C.

(57) ABSTRACT

A molded body treating apparatus includes a support, at least one flat plate and a first movement mechanism. The support is configured to support a honeycomb molded body which has a first end portion and a second end portion in a longitudinal direction of the honeycomb molded body and which includes a plurality of cells each extending along the longitudinal direction from a first end at the first end portion to a second end at the second end portion. Either the first end or the second end of each of the plurality of cells is sealed with a plug material paste. The first movement mechanism is configured to move the at least one flat plate along the longitudinal direction to press the either one of the first and second end portions.

17 Claims, 10 Drawing Sheets

U.S. PATENT DOCUMENTS

| | | | |
|---|---|---|---|
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 | 11/2008 | Ohno et al. | |
| 7,462,216 B2 | 12/2008 | Kunieda et al. | |
| 7,473,465 B2 | 1/2009 | Ohno et al. | |
| 2002/0135107 A1 * | 9/2002 | Nishi et al. | 264/630 |
| 2004/0161596 A1 | 8/2004 | Taoka et al. | |
| 2005/0109023 A1 | 5/2005 | Kudo et al. | |
| 2005/0153099 A1 | 7/2005 | Yamada | |
| 2005/0169819 A1 | 8/2005 | Shibata | |
| 2005/0175514 A1 | 8/2005 | Ohno | |
| 2005/0180898 A1 | 8/2005 | Yamada | |
| 2005/0247038 A1 | 11/2005 | Takahashi | |
| 2005/0272602 A1 | 12/2005 | Ninomiya | |
| 2006/0029897 A1 | 2/2006 | Saijo et al. | |
| 2006/0029898 A1 | 2/2006 | Saijo et al. | |
| 2006/0043652 A1 | 3/2006 | Saijo et al. | |
| 2006/0051556 A1 | 3/2006 | Ohno et al. | |
| 2006/0073970 A1 | 4/2006 | Yamada | |
| 2006/0108347 A1 | 5/2006 | Koyama et al. | |
| 2006/0118546 A1 | 6/2006 | Saijo | |
| 2006/0166820 A1 | 7/2006 | Ogyu et al. | |
| 2006/0210765 A1 | 9/2006 | Ohno et al. | |
| 2006/0213164 A1 * | 9/2006 | Hatano et al. | 55/523 |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0230732 A1 | 10/2006 | Kunieda | |
| 2006/0245465 A1 | 11/2006 | Saijo et al. | |
| 2006/0269722 A1 | 11/2006 | Yamada | |
| 2007/0020155 A1 | 1/2007 | Ohno et al. | |
| 2007/0028575 A1 | 2/2007 | Ohno et al. | |
| 2007/0044444 A1 | 3/2007 | Oshimi | |
| 2007/0068128 A1 | 3/2007 | Oshimi et al. | |
| 2007/0085233 A1 | 4/2007 | Yamada | |
| 2007/0116908 A1 | 5/2007 | Ohno et al. | |
| 2007/0126160 A1 | 6/2007 | Takahashi | |
| 2007/0128405 A1 | 6/2007 | Sakaguchi et al. | |
| 2007/0130897 A1 | 6/2007 | Sakaguchi et al. | |
| 2007/0144561 A1 | 6/2007 | Saijo et al. | |
| 2007/0148403 A1 | 6/2007 | Yamamura et al. | |
| 2007/0152382 A1 | 7/2007 | Yamada | |
| 2007/0169453 A1 | 7/2007 | Hayakawa | |
| 2007/0178275 A1 | 8/2007 | Takahashi | |
| 2007/0190350 A1 | 8/2007 | Ohno et al. | |
| 2007/0196620 A1 | 8/2007 | Ohno et al. | |
| 2007/0204580 A1 | 9/2007 | Kunieda | |
| 2007/0212517 A1 | 9/2007 | Ohno et al. | |
| 2007/0262498 A1 | 11/2007 | Saijo et al. | |
| 2007/0293392 A1 | 12/2007 | Ohno et al. | |
| 2008/0067725 A1 | 3/2008 | Naruse | |
| 2008/0084010 A1 | 4/2008 | Naruse | |
| 2008/0088072 A1 | 4/2008 | Kobayashi | |
| 2008/0106008 A1 | 5/2008 | Kasai et al. | |
| 2008/0106009 A1 | 5/2008 | Naruse et al. | |
| 2008/0116200 A1 | 5/2008 | Kawai et al. | |
| 2008/0120950 A1 | 5/2008 | Ohno et al. | |
| 2008/0136053 A1 | 6/2008 | Kuribayashi et al. | |
| 2008/0136062 A1 | 6/2008 | Kasail et al. | |
| 2008/0138567 A1 | 6/2008 | Ninomiya et al. | |
| 2008/0150200 A1 | 6/2008 | Tajima | |
| 2008/0157445 A1 | 7/2008 | Kawai et al. | |
| 2008/0160249 A1 | 7/2008 | Makino | |
| 2008/0174039 A1 | 7/2008 | Saijo et al. | |
| 2008/0190081 A1 | 8/2008 | Oshimi | |
| 2008/0190083 A1 | 8/2008 | Oshimi | |
| 2008/0197544 A1 | 8/2008 | Saijo et al. | |
| 2008/0213485 A1 | 9/2008 | Shibata | |
| 2008/0236115 A1 | 10/2008 | Sakashita | |
| 2008/0236122 A1 | 10/2008 | Ito | |
| 2008/0236724 A1 | 10/2008 | Higuchi | |
| 2008/0237942 A1 | 10/2008 | Takamatsu | |
| 2008/0241015 A1 | 10/2008 | Kudo et al. | |
| 2008/0241444 A1 | 10/2008 | Oshimi | |
| 2008/0241466 A1 | 10/2008 | Saito et al. | |
| 2008/0284067 A1 | 11/2008 | Naruse et al. | |
| 2008/0305259 A1 | 12/2008 | Saijo | |
| 2008/0318001 A1 | 12/2008 | Sakakibara | |
| 2009/0004431 A1 | 1/2009 | Ninomiya | |
| 2009/0107879 A1 | 4/2009 | Otsuka et al. | |
| 2009/0130378 A1 | 5/2009 | Imaeda et al. | |

FOREIGN PATENT DOCUMENTS

| | | |
|---|---|---|
| JP | 57-007215 | 1/1982 |
| JP | 58-037481 | 3/1983 |
| JP | 10-314523 | 12/1998 |
| JP | 2004-290766 | 10/2004 |
| JP | 2005-125318 | 5/2005 |

* cited by examiner

A-A line cross-sectional view

SEALING METHOD OF HONEYCOMB MOLDED BODY, AND METHOD FOR MANUFACTURING CELL-SEALED HONEYCOMB FIRED BODY

CROSS-REFERENCE TO RELATED APPLICATIONS

The present application claims priority under 35 U.S.C. §120 to PCT Application No. PCT/JP2006/309825, filed on May 17, 2006, entitled "HONEYCOMB MOLDED BODY END FACE TREATING APPARATUS, SEALING METHOD OF HONEYCOMB MOLDED BODY, AND METHOD FOR MANUFACTURING HONEYCOMB STRUCTURED."

The contents of this application are incorporated herein by reference in their entirety.

BACKGROUND OF THE INVENTION

1. Field of the Invention

The present invention relates to a molded body treating apparatus, a sealing method of a honeycomb molded body, and a method for manufacturing a cell-sealed honeycomb fired body.

2. Discussion of the Background

Particulates such as soot and the like contained in the exhaust gas expelled by the internal combustion engines of vehicles such as busses and trucks, and construction equipment and the like, have become a problem of recent, in that they cause harm to the environment and the human body. To remedy this, there are currently being proposed various kinds of honeycomb filters using a honeycomb structured body of porous ceramic as a filter for capturing particulates contained in exhaust gases, and thus purifying the exhaust gas.

Conventionally, when manufacturing a honeycomb structured body, first, ceramic powder, binder, and a liquid dispersal medium, for example, are mixed together to prepare a moist mixture. The moist mixture is then continuously extrusion molded using a die, and the extruded molded body is then cut to a prescribed length. Carrying out above manufactures a pillar-shaped honeycomb molded body.

Next, the honeycomb molded body obtained above is dried out, and afterward a plug material paste is filled into prescribed cells to carry out sealing on the cells so that a sealed state of either end portion of the cells is achieved. After the sealed state has been achieved, degreasing and firing treatments are carried out, thereby manufacturing the honeycomb fired body.

After this, a sealing material paste is applied to the side face of the honeycomb fired body, and using an adhesive, a multitude of honeycomb fired bodies is adhered together. This state of the multitude of honeycomb fired bodies being bonded together by interposing a sealing material layer (an adhesive layer) manufactures a honeycomb fired body aggregate. A cutting treatment is carried out to the achieved aggregate of honeycomb fired bodies using a cutting machine or the like, to form a ceramic block of a prescribed form, such as cylindrical or cylindroid form. Finally, sealing material paste is applied to the external circumference of the ceramic block to form a sealing material layer (a coat layer), thus completing the manufacture of the honeycomb structured body.

In the present description the term 'end face' is used to refer to any face of the faces constituting the external shape of either honeycomb form (that is, the honeycomb molded body, the honeycomb fired body, or the honeycomb structured body) at which cells are exposed, while the term 'side face' is used to refer to all faces other than the end faces.

Here, flatness on the end face of a honeycomb fired body to which sealing of the cell has been carried out to be sought in light of uniformity of the outward appearance and physical properties thereof.

In order to adjust the shape of the sealed portion of the cell which is sealed by such a plug, there is disclosed in a method for manufacturing a honeycomb structured body including a process of sealing cells by soaking end faces of a honeycomb structured body in a slurry inside of a storage container and then pressurizing the slurry to thereby seal the cells, a method for removing slurry adhered to the end faces and drying the end faces when separating the honeycomb structured body from within the storage container. See, for example, Japanese Unexamined Patent Application Publication No. 2004-290766. The contents of this publication are incorporated herein by reference in their entirety.

Here, in conventional cases in which cells intended to be sealed cannot be sealed assuredly, the honeycomb structured body is not able to fulfill its function as a filter, and because of this, sealing of the cells is carried out in a manner in which prescribed cells are sealed with an amount of plug material paste enabling assured sealing of the cells. However, if one attempts to carry out sealing of an amount of plug material paste enabling assured sealing of the cells, there arise cases in which the plug material paste comes to protrude from the cells and the protruded plug material paste adheres to edges of the cell walls.

Japanese Unexamined Patent Application Publication No. 2004-290766 describes that, on the sealed portion of the cell, it is possible to prevent the concave (so-called recesses) receding toward the interior portion of the cells or shrinking of the plugging slurry. However, the method for manufacturing a honeycomb structured body of Patent Document 1 focuses only on slurry recesses generated when separating the honeycomb structured body from within the storage container as an object of adjusting the shape of the honeycomb structured body, and while it is indeed effective in the prevention of this kind of recess the above mentioned method was not able to do anything about the state of slurry protruding to the outside of the cells.

SUMMARY OF THE INVENTION

According to one aspect of the present invention, a molded body treating apparatus includes a support, at least one flat plate and a first movement mechanism. The support is configured to support a honeycomb molded body which has a first end portion and a second end portion in a longitudinal direction of the honeycomb molded body and which includes a plurality of cells each extending along the longitudinal direction from a first end at the first end portion to a second end at the second end portion. Either the first end or the second end of each of the plurality of cells is sealed with a plug material paste. At least one flat plate movable along the longitudinal direction has a flat surface substantially perpendicular to the longitudinal direction to face either one of the first and second end portions. The first movement mechanism is configured to move the at least one flat plate along the longitudinal direction to press the either one of the first and second end portions.

According to another aspect of the present invention, a sealing method of a honeycomb molded body includes filling a plug material paste into either a first end or a second end of each of a plurality of cells of a honeycomb molded body which has a first end portion and a second end portion in a longitudinal direction of the honeycomb molded body. The plurality of cells each extends along the longitudinal direction from the first end at the first end portion to the second end at the second end portion. The honeycomb molded body is supported. At least one flat plate which is movable along the longitudinal direction and which has a flat surface substantially perpendicular to the longitudinal direction to face either one of the first and second end portions is provided. The at least one flat plate is moved along the longitudinal direction to press the either one of the first and second end portions so as to flatten the first end portion and the second end portion.

According to further aspect of the present invention, a method for manufacturing a cell-sealed honeycomb fired body includes forming a honeycomb molded body which has a first end portion and a second end portion in a longitudinal direction of the honeycomb molded body and which includes a plurality of cells each extending along the longitudinal direction from a first end at the first end portion to a second end at the second end portion, filling a plug material paste into either the first end or the second end of each of the plurality of cells to form a cell-sealed honeycomb molded body, supporting the cell-sealed honeycomb molded body, providing at least one flat plate movable along the longitudinal direction and having a flat surface substantially perpendicular to the longitudinal direction to face either one of the first and second end portions, moving the at least one flat plate along the longitudinal direction to press the either one of the first and second end portions so as to flatten the first end portion and the second end portion, and firing the cell-sealed honeycomb molded body to produce the cell-sealed honeycomb fired body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1-2 is a horizontal cross sectional view of the honeycomb molded body end face treating apparatus according to the embodiment of the present invention shown in FIG. 1-1;

FIGS. 2(a) to 2(d) are schematic views showing a process of carrying out flattening treatment to an end portion of a cell-sealed honeycomb molded body, and shows a cross section that was produced by cutting the cell-sealed honeycomb molded body at a plane surface parallel to the longitudinal direction in a manner so as to include sealed cells;

DESCRIPTION OF THE EMBODIMENTS

Figure 1:
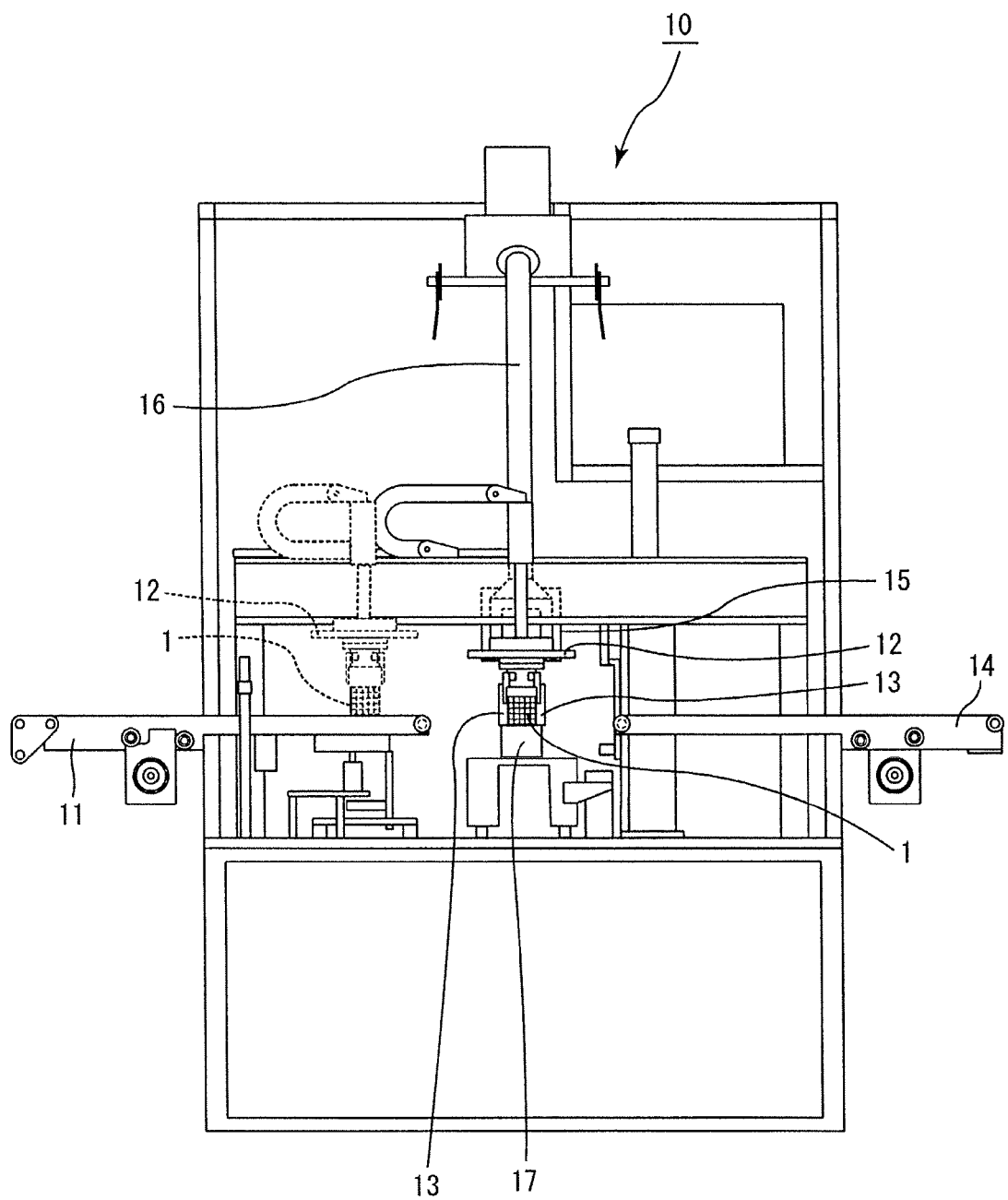
FIG. 1-1 is a vertical cross sectional view schematically showing a honeycomb molded body end face treating apparatus according to an embodiment of the present invention.

The embodiments will now be described with reference to the accompanying drawings, wherein like reference numerals designate corresponding or identical elements throughout the various drawings.

First, description will be given in regard to the honeycomb molded body end face treating apparatus according to an embodiment of the present invention while referencing the figures.

The honeycomb molded body end face treating apparatus according to an embodiment of the present invention is a honeycomb molded body end face treating apparatus for flattening an end face of a cell-sealed honeycomb molded body in which a multitude of cells are placed in parallel with one another in the longitudinal direction with a cell wall therebetween, and either end portion of the cells is sealed with a plug material paste, including:

a flat plate disposed so as to face the end face of the cell-sealed honeycomb molded body in a parallel manner; and a first flat plate movement mechanism for moving the flat plate while maintaining the state in which the flat plate faces the end face in a parallel manner, the first flat plate movement mechanism configured to move the flat plate so that the flat plate is pressed against the end face of the cell-sealed honeycomb molded body.

It is possible to optimally use a cell-sealed honeycomb molded body, which has the same shape as the honeycomb fired body shown in FIGS. 5(a) and (b), and which has either end portion of its cells sealed with a plug material paste, as the item intended for end face treatment carried out using the honeycomb molded body end face treating apparatus according to an embodiment of the present invention.

Now although as long as the item intended for end face treatment is a cell-sealed honeycomb molded body it does not matter if it has passed through drying treatment or not, but it is preferable that the item intended for end face treatment be a cell-sealed honeycomb molded body that has passed through drying for the sake of carrying out the end face treatment effectively.

Figures 1, 2:
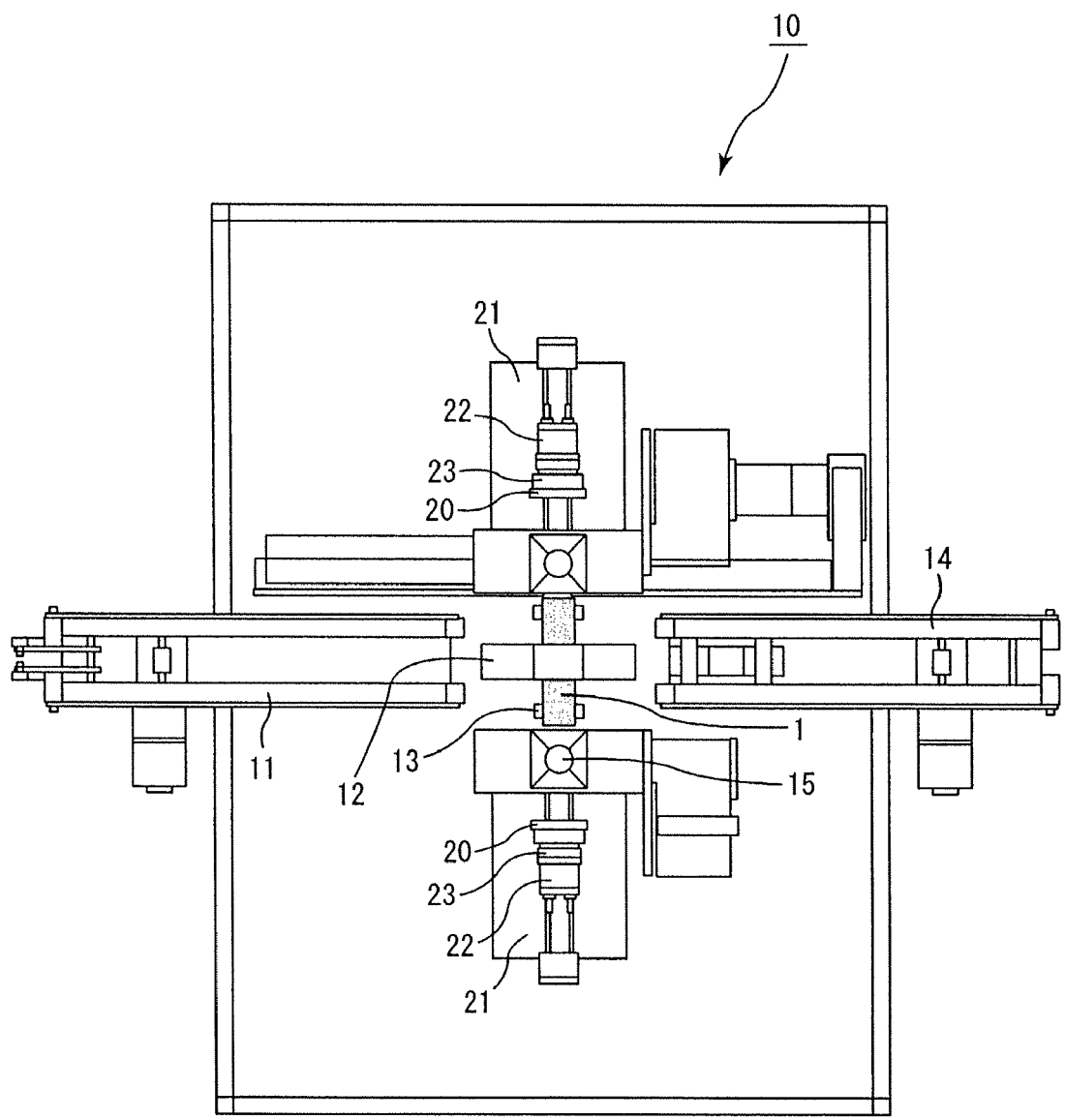
Figure 2:
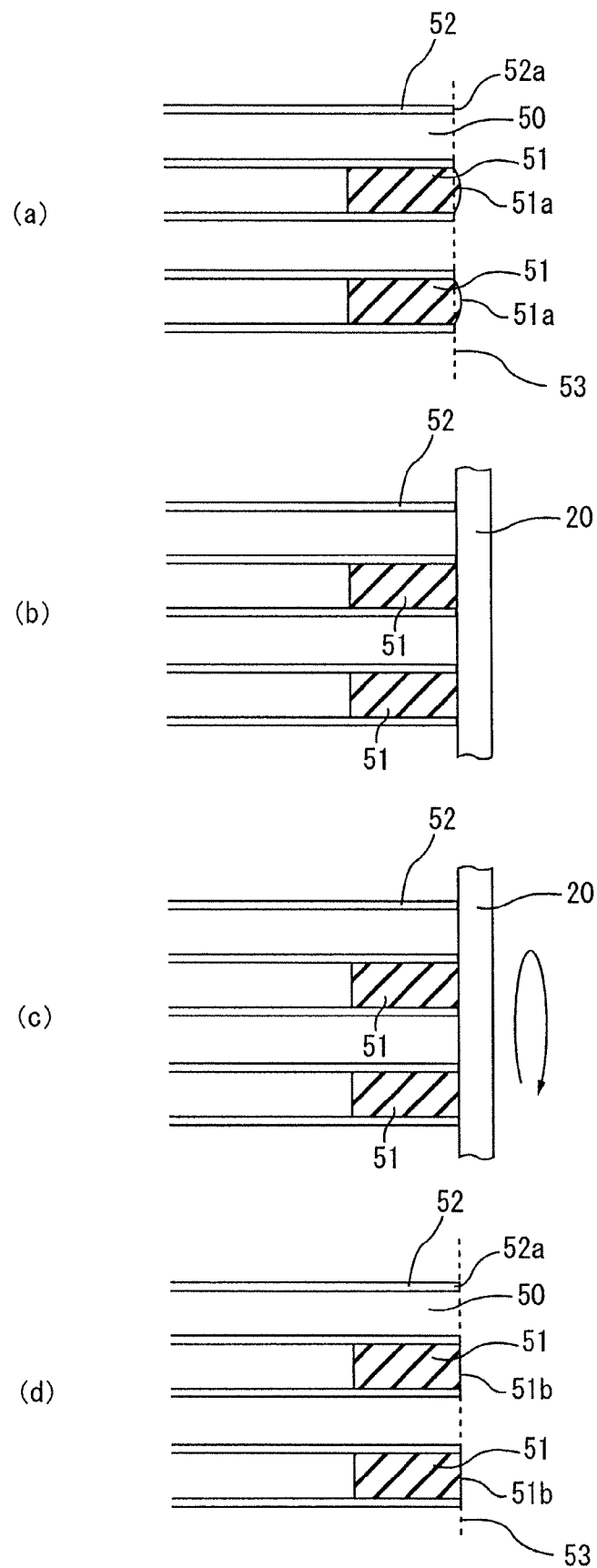

FIG. 1-1 is a vertical cross sectional view schematically showing an example of an embodiment of a honeycomb molded body end face treating apparatus according to an embodiment of the present invention, and FIG. 1-2 is a horizontal cross sectional view of the honeycomb molded body end face treating apparatus according to an embodiment of the present invention shown in FIG. 1-1.

A honeycomb molded body end face treating apparatus 10 comprises a flat plate 20 and a first flat plate movement mechanism 21. The flat plate 20 is disposed so as to face an end face of a cell-sealed honeycomb molded body 1 in a parallel manner. The first flat plate movement mechanism 21 is configured to move the flat plate 20 while maintaining the state in which the flat plate 20 faces the above mentioned end face in a parallel manner. Moreover, the honeycomb molded body end face treating apparatus 10 comprises a second flat plate movement mechanism 22, which is configured to move the flat plate 20 within the same plane that the flat plate 20 occupies when the flat plate 20 is in a state of making contact with the end face of the above mentioned cell-sealed honeycomb molded body 1 (see FIG. 1-2).

Also, the honeycomb molded body end face treating apparatus 10 comprises an induction conveyer 11, a transport arm 12 and a carrying-out conveyer 14 for the purpose of inducting and carrying out the cell-sealed honeycomb molded body 1 into and from the honeycomb molded body end face treating apparatus 10. The induction conveyer 11 is configured to convey the cell-sealed honeycomb molded body 1 into the honeycomb molded body end face treating apparatus 10; the transport arm 12 is configured to move the cell-sealed honeycomb molded body 1 to a prescribed location; and the carrying-out conveyer 14 is configured to convey the cell-sealed honeycomb molded body 1 out of the honeycomb molded body end face treating apparatus 10.

Disposed in the central portion of the honeycomb molded body end face treating apparatus 10 in between the induction conveyer 11 and the carrying-out conveyer 14 are a molded body placement platform 17 and a support chuck 13. The molded body placement platform 17 is for placing the cell-sealed honeycomb molded body 1 during the end face treatment, and the support chuck 13 is for sandwiching and thus firmly fixing the cell-sealed honeycomb molded body 1 to the molded body placement platform 17 during the time in which the cell-sealed honeycomb molded body 1 is placed on the molded body placement platform 17.

Moreover, there is an adhered material removal mechanism 15 located at the upper side with respect to the space in between the molded body placement platform 17 and the flat plate 20, and the adhered material removal mechanism 15 is disposed in a manner enabling it to descend and ascend in order to remove constituent material of the cell-sealed honeycomb molded body 1 adhering to the flat plate 20. Also, installed onto the upper face of this adhered material removal mechanism 15 is a duct 16 for the purpose of expelling this removed adhered material out of the apparatus.

The flat plate 20 is disposed as a pair of two flat plates 20 facing each other from the near side and the far side of the honeycomb molded body end face treating apparatus 10 as shown in FIG. 1-2. More specifically, each of the two flat plates 20 is disposed on respective sides of a single run of the conveyance line passed through by the cell-sealed honeycomb molded body 1, and is enabled to flatten both end faces of the cell-sealed honeycomb molded body 1 at the same time, using the pair of flat plates 20 and pressing against respective end faces at both ends of a single cell-sealed honeycomb molded body 1.

Also, the flat plate 20 is joined with the second flat plate movement mechanism 22 which comprises a stepping motor having a shaft member serving as a rotation shaft, and is thus configured to enable rotating of the flat plate 20 within the plane that the flat plate occupies when it is in a state of being pressed against the end face of the cell-sealed honeycomb molded body 1. And this second flat plate movement mechanism 22 is supported by a support plate 23 in such a manner as to make the above mentioned shaft member horizontally situated, and this support plate 23 is joined at its bottom portion with the first flat plate movement mechanism 21 which comprises a ball screw. Therefore, the flat plate 20 is configured in a manner able to advance forward toward or retreat back from both end faces of the cell-sealed honeycomb molded body 1 by the driving of the first flat plate movement mechanism 21 through the support plate 23, and moreover, the flat plate 20 is able to move within the plane it occupies by the driving of the second flat plate movement mechanism 22.

The adhered material removal mechanism 15 is disposed at the upper side with respect to a face (hereinafter also simply termed 'press face') of the flat plate 20 to be pressed against the end face of the cell-sealed honeycomb molded body 1. In order to remove materials such as ceramic powder adhering to the press face of the flat plate 20, the adhered material removal mechanism 15 is configured to descend and carry out removal treatment of the adhered material after contacting the press face of the flat plate 20, thereby removing the above mentioned adhered material. The adhered material removed here is then expelled out of the honeycomb molded body end face treating apparatus 10 through the duct 16.

In a case of carrying out flattening with this honeycomb molded body end face treating apparatus 10, first, the cell-sealed honeycomb molded body 1 is placed onto the induction conveyer 11 to convey it into the honeycomb molded body end face treating apparatus 10. Afterward, it is moved near the central portion in front of the molded body placement platform 17.

Then, the cell-sealed honeycomb molded body 1 indicated by the broken line in FIG. 1-1 is grasped with the transport arm 12 and lifted up to be placed on the molded body placement platform 17. Afterward, the support chuck 13 sandwiches the cell-sealed honeycomb molded body 1 at its side faces near the end portions near both ends of the cell-sealed honeycomb molded body 1, to thereby firmly fix the cell-sealed honeycomb molded body 1 to the molded body placement platform 17 so that end face treatment is carried out.

After firmly fixing the cell-sealed honeycomb molded body 1 to the molded body placement platform 17, each of the two flat plates 20 joined to the second flat plate movement mechanism 22 is moved by the driving of the first flat plate movement mechanism 21, toward both end faces of the cell-sealed honeycomb molded body 1 in a state of the flat plate 20 facing the end faces in a parallel manner, so that the respective end faces are pressed against with at a prescribed weight. Flattening of the end faces of the cell-sealed honeycomb molded body 1 is carried out by rotating the flat plate 20 to a prescribed angle within the same plane it occupies by using the second flat plate movement mechanism 22, when the flat plate 20 is in a state of being pressed against the end faces of the cell-sealed honeycomb molded body 1.

Next, the flat plate 20 is retracted to separate from the end face and returned to its original position. Afterward, the adhered material removal mechanism 15 such as a rotary brush is set into operation, thereby descending to the height of the flat plate 20 where the adhered material removal mechanism 15 and the press face of the flat plate 20 thereby make contact. According to this, any material adhering to the press face of the flat plate 20 is removed.

The cell-sealed honeycomb molded body 1 to which end face flattening has been completed is then lifted up once more by the transport arm 12 and placed on the carrying-out conveyer 14 whereby it is conveyed out of the honeycomb molded body end face treating apparatus 10.

FIGS. 2(a) to 2(d) are views schematically showing the process of carrying out flattening treatment to the end portion of the cell-sealed honeycomb molded body, and show a cross section of a plane surface of the cell-sealed honeycomb molded body horizontal to the longitudinal direction in a manner including the sealed cells.

Here, description will be given to a summary of the above mentioned flattening treatment process using these figures.

As shown in FIG. 2(a), in the end face of the cell-sealed honeycomb molded body before the flattening treatment, a plug end portion 51a of a plug material paste 51 is protruded with respect to a plane surface 53 comprising a cell wall end portion 52a.

At that point, by moving the flat plate 20 to press it against the above mentioned end face as shown in FIG. 2(b), the once-protruded plug end portion 51a of the plug material paste is pressed in to conform to the plane surface of the flat plate 20. It is possible to use the above described first flat plate movement mechanism 21 for this movement of the flat plate 20.

Furthermore, as is shown in FIG. 2(c) it is possible to increase the degree of flattening by moving the flat plate 20 within the same plane that the flat plate 20 occupies, while it is in a state of being pressed against the above mentioned end face. It is possible to use the above described second flat plate movement mechanism 22 for this movement of the flat plate 20, and it is particularly preferable to carry out rotational movement within the same plane that the flat plate 20 occupies. The arrow in FIG. 2 (c) indicates the rotation of the flat plate.

Then, as shown in FIG. 2(d), as a plane surface comprising a plug end portion 51b of the plug material paste to which flattening treatment has been carried out comes to form a portion of the plane surface 53 on the end face of the cell-sealed honeycomb molded body that has passed through the above mentioned flattening process, the flattening treatment is thereby completed.

It is acceptable for the cell-sealed honeycomb molded body 1 to be placed in a manner in which the longitudinal direction of the cell-sealed honeycomb molded body 1 is orthogonal with respect to the conveyance direction of the induction conveyer or the carrying-out conveyer, as it is also acceptable for the cell-sealed honeycomb molded body 1 to be placed in a manner which the longitudinal direction of the cell-sealed honeycomb molded body 1 is horizontal with respect to the same directions, however, in consideration of factors such as placement space or the movement direction of the flat plate 20, it is preferable for the cell-sealed honeycomb molded body 1 to be placed in a manner in which its longitudinal direction is orthogonal with respect to the conveyance direction of the induction conveyer or the carrying-out conveyer.

As long as they are able to carry out conveyance of the cell-sealed honeycomb molded body 1, the induction conveyer 11 and the carrying-out conveyer 14 are not particularly limited, and it is possible to optimally use conveyers such as a belt conveyer, a chain conveyer.

As long as it is able to place the cell-sealed honeycomb molded body 1 onto the molded body placement platform 17 without harming the cell-sealed honeycomb molded body 1, the mechanism of the transport arm 12 is not particularly limited, and aside from the grasping mechanism mentioned herein above, it is also acceptable to use mechanisms such as suction conveyance mechanisms configured to suck the top face of the cell-sealed honeycomb molded body 1 thereby lifting it, as well as lift mechanisms such as a forklift.

Although examples of a single unit of the transport arm 12 being disposed are shown in FIGS. 1-1 and 1-2, the number of disposed units of the transport arm 12 is not particularly limited, and can be 2 units instead of 1 unit. In a case of there being 2 units of the transport arm 12 disposed, it is possible to employ a constitution in which the 2 transport arm 12 units, being disposed in line along the conveyance direction of the conveyance line, convey the cell-sealed honeycomb molded body 1 in a synchronous manner. Put more specifically, one of the transport arms works back and forth in between the induction conveyer 11 and the molded body placement platform 17 while the other transport arm works back and forth in between the molded body placement platform 17 and the carrying-out conveyer 14. According to the movement of both units, it is possible to carry out the conveyance operation of moving the cell-sealed honeycomb molded body 1 from the induction conveyer 11 to place it onto the molded body placement platform 17, and the conveyance operation of conveying the cell-sealed honeycomb molded body 1 from the molded body placement platform 17 to the carrying-out conveyer 14 in a single run, thereby omitting the wastefulness of round-trip movement and thereby improving operational efficiency.

The support chuck 13 is installed on the molded body placement platform 17 in a manner able to grasp the side face of the cell-sealed honeycomb molded body 1 from both sides. The number of units of the support chuck 13 to be disposed is not particularly limited, as it is acceptable to dispose a pair of the support chuck 13 so as to grasp the cell-sealed honeycomb molded body 1 at a single site at the central portion of the cell-sealed honeycomb molded body 1, as it is also acceptable to dispose two pairs of the support chuck 13, each pair at a site near respective end portions at both sides of the cell-sealed honeycomb molded body 1. In order to effectively prevent vibrations and the like during end face treatment, and in order to firmly fix the cell-sealed honeycomb molded body 1 to the molded body placement platform 17 in an even more assured manner, it is preferable to dispose two pairs of the support chuck 13 to thereby support at the sites near both end portions of the cell-sealed honeycomb molded body 1.

It is preferable that the contact face of the support chuck 13 with the cell-sealed honeycomb molded body 1 be coated with an elastic material such as urethane resin, epoxy resin, silicon resin, natural rubber, and synthetic rubber, to prevent the surface of the cell-sealed honeycomb molded body 1 from being damaged.

The amount of pressure applied when the support chuck 13 grasps the cell-sealed honeycomb molded body 1 is to an extent which will not occur deformation such as dents in the cell-sealed honeycomb molded body 1, and to an extent which makes it possible to suppress vibrations and the like that arise during end face treatment. Although the amount of the grasping pressure is not particularly limited, it is preferable to be in the range of 10 to 50 kPa for example.

The material usable as the constituent material of the flat plate 20 is not particularly limited as long as it is one having abrasion resistance and durability properties. Examples of the material usable as the constituent material of the flat plate 20 include, for example, ceramics such as silicon carbide and tungsten carbide, metals such as stainless (SUS) and steel, and special metals such as nickel alloy. It is also acceptable for there to be a resin, ceramic, or metallic coat layer coated and hardened on a flat plate 20 constituted from the above mentioned material, and it is also acceptable for these coat layers to be formed according to plating, spray coating, or like techniques. Also, it is acceptable to carry out a polishing treatment to the surface of the flat plate, or to the coat layer.

Also, it is acceptable for a heating mechanism such as a heater to be comprised inside of the flat plate 20. In a case in which such a heating mechanism is disposed in the flat plate 20, it is possible to carry out drying of the plug material paste by pressing the flat plate, which has been heated by the above mentioned heating mechanism, against an end portion of a cell-sealed honeycomb molded body in a plug material paste drying process to be further described herein after.

Also, the shape of the flat plate 20 as viewed from the direction of the press face of the flat plate 20 is not particularly limited as long as it is larger than the end face of the cell-sealed honeycomb molded body 1. The shape of the flat plate 20 may be an arbitrary shape such as a square, rectangular or cylindrical.

In the honeycomb molded body end face treating apparatus according to an embodiment of the present invention, desirably, two of the flat plates are disposed, and the first flat plate movement mechanism is configured to move each of the two flat plates so that each of the two flat plates are pressed against respective end faces at both ends of the cell-sealed honeycomb molded body.

In the honeycomb molded body end face treating apparatus 10 it is acceptable for the number of units of the flat plate 20 to be disposed per single unit of the cell-sealed honeycomb molded body 1 to be 1 unit as well as 2 units. More specifically, in a case in which 1 flat plate 20 is disposed in the honeycomb molded body end face treating apparatus 10, for example, it is acceptable to carry out flattening treatment by firstly situating the end face not currently intended to be pressed by the flat plate 20 against a fixing plate or the like, and then press the other end face with the flat plate 20. Also, it is possible to carry out flattening treatment to the end face of the cell-sealed honeycomb molded body 1 without situating the face not currently intended to be pressed by the flat plate 20 against a fixing plate and the like, but instead firmly fixing the cell-sealed honeycomb molded body 1 to the molded body placement platform 17 with support by only support chuck 13.

In this manner, in the honeycomb molded body end face treating apparatus 10, even in a case in which there is 1 flat plate 20 disposed therein, it is possible to carry out sufficient flattening of the end faces of the cell-sealed honeycomb molded body 1; however as has been explained referencing FIG. 1-2, if there are 2 flat plates 20 disposed therein with respect to a single cell-sealed honeycomb molded body, it is possible to carry out flattening of both end faces of the cell-sealed honeycomb molded body 1 at one time, which thereby makes it possible to reduce the time and costs required for the end face treatment while making it possible to increase the degree of uniformity of the flattening carried out on both end faces.

The face of the flat plate which is to be pressed against the cell-sealed honeycomb molded body desirably has a surface roughness Ra of at least about 0.04 μm and at most about 4.0 μm. Now, in the present description the surface roughness Ra is an arithmetic mean roughness defined by JIS B 0601.

The contents of JIS B 0601 are incorporated herein by reference in its entirety.

The surface roughness Ra of the press face of the flat plate 20 may be set in correspondence to the desired degree of flatness; however, by the surface roughness Ra being in the above mentioned range it is possible to hold down polishing costs and the like necessary for the adjustment of surface roughness while making it possible to carry out flattening of the end faces of the cell-sealed honeycomb molded body at a high degree of precision.

A weight at which the flat plate is to be pressed against the cell-sealed honeycomb molded body is desirably in the range of at least about 9.8N and at most about 49N (at least about 1 kgf and at most about 5 kgf).

If the weight applied when the flat plate 20 is pressed against the end face of the cell-sealed honeycomb molded body is less than about 9.8N (about 1 kgf), it is not possible to carry out flattening of the end face of the cell-sealed honeycomb molded body 1 in an effective manner, while alternately, if the above mentioned weight is more than about 49N (about 5 kgf) there arises the concern that the end face will undergo deformation, or that the cell-sealed honeycomb molded body 1 itself will undergo deformation.

The honeycomb molded body end face treating apparatus according to an embodiment of the present invention desirably further comprises: a second flat plate movement mechanism for moving the flat plate which is in a state of being pressed against the end face of the cell-sealed honeycomb molded body within the same plane that the flat plate occupies, as is shown in FIGS. 1-1 and 1-2.

In the honeycomb molded body end face treating apparatus 10, it is possible to carry out sufficient flattening of the end face of the cell-sealed honeycomb molded body 1 even if the flat plate 20 is not set into motion within the same plane it occupies by the second flat plate movement mechanism 22 since the flat plate 20 is made to move in parallel with the end face. However, as has been explained already referencing FIG. 1-2, if the honeycomb molded body end face treating apparatus 10 comprises the second flat plate movement mechanism 22, it is possible to carry out flattening of the end face of the cell-sealed honeycomb molded body 1 in an even more effective manner since it becomes possible to move the flat plate 20 which is in a state of being pressed against the end face within the same plane it occupies. Whether or not the second flat plate movement mechanism is included in the honeycomb molded body end face treating apparatus 10 may be disposed in correspondence to the desired degree of flatness of the end face.

The movement of the flat plate 20 in the above mentioned same plane it occupies is not limited to being rotational movement around a center shaft member joined with the flat plate 20. It is acceptable for the above mentioned movement of the flat plate 20 to be horizontal movement in the up, down, left, right or diagonal directions with respect to the end face, as it is also acceptable to be a combination of horizontal and rotational movement. However, when considering factors such as movement space and movement efficiency, it is preferable that the movement of the flat plate 20 in the above mentioned same plane it occupies be rotational movement.

Here, in the present specification, the term "same plane the flat plate occupies" refers to a state of a face formed by a main surface of the flat plate in which the face after movement of the flat plate is within the same main surface of the flat plate before the movement of the flat plate.

In times when the above mentioned movement of the flat plate 20 in the above mentioned same plane it occupies is rotational movement, it is preferable that the angle of rotation be in the range of at least about 10 degrees and at most about 150 degrees, and even more preferable in the range of at least about 10 degrees and at most about 90 degrees.

If the angle of rotation is less than about 10 degrees flattened plug comes to adhere to the flat plate. This adhered plug makes it impossible to carry out further flattening, and is easily prone to peeling off of the adhered plug which gives rise to the concern that the end face will undergo deformation due to this influence.

Alternately, if the angle of rotation is great, stress builds in between the flat plate and the end face giving rise to the concern of deformation of the end face or the generation of cracking, and because of this it is preferable that the angle of rotation be about 150 degrees or less, and with an even more preferable angle of rotation of about 90 degrees or less it is possible to carry out flattening to a sufficient degree with no generation of cracking on the end face.

Because of this, if the above mentioned angle of rotation is in the range of at least about 10 degrees and at most about 90 degrees it is possible to carry out flattening of the end face in a precise manner.

It is preferable that the honeycomb molded body end face treating apparatus 10 comprise the adhered material removal mechanism 15 for removing material adhering to the face of the flat plate 20 which is to be pressed against the cell-sealed honeycomb molded body 1.

As stated herein above, by comprising the adhered material removal mechanism 15 it is possible to remove material that has adhered during end face treatment, and because of this, the adhered material removal mechanism 15 proves to be an effective means in cases in which an even higher degree of flattening is required on the end face of the cell-sealed honeycomb molded body 1.

The constitution of the adhered material removal mechanism 15 is not particularly limited, and feasible examples include, for instance, a rotary brush of the kind mentioned herein above, sponge, buff, whetstone, air-blow, cloth, wiper, and like constitutions able to carry out so-called cleaning of the press face of the flat plate 20. The adhered material thereby removed by this adhered material removal mechanism 15 is then expelled through the duct 16 out of the honeycomb molded body end face treating apparatus 10.

It is preferable that the honeycomb molded body end face treating apparatus according to an embodiment of the present invention be constituted in a manner so as to carry out flattening of one or both end faces of a plurality of cell-sealed honeycomb molded bodies at one time.

The honeycomb molded body end face treating apparatus 10 is able to carry out flattening of both end faces of the cell-sealed honeycomb molded body 1 at one time by carrying out an end face treatment using the flat plate 20, the first flat plate movement mechanism 21, and disposed according to necessity the second flat plate movement mechanism 22, as a single end face treatment unit to one end face of the cell-sealed honeycomb molded body 1, and using an identical end face treatment unit for the other end face of the same cell-sealed honeycomb molded body 1. Put more plainly, it is possible to carry out flattening of both end faces of a single cell-sealed honeycomb molded body 1 according to a pair of end face treatment units.

It is acceptable for the honeycomb molded body end face treating apparatus 10 to comprise a single pair of end face treatment units as shown in FIG. 1-2, as it is also acceptable to compromise a plurality of pairs of end face treatment units. In a case in which a plurality of end face treatment units are comprised it is possible to carry out flattening of both end faces of each of a plurality of cell-sealed honeycomb molded bodies 1 at one time, which makes it possible to hold down time and costs required in the flattening treatment while enjoying improvements in the uniformity of the physical properties of the end faces of the cell-sealed honeycomb molded bodies 1 after the end face treatment, due to the flattening treatment conditions being as uniform as is possible.

It is acceptable for the honeycomb molded body end face treating apparatus 10 to comprise a constitution having a end face treatment unit having established therein a plurality of flat plate portions configured to be pressed against the end face of the cell-sealed honeycomb fired body, and able to carry out flattening treatment of a plurality of cell-sealed honeycomb molded bodies 1 at one time with a pair of end face treatment units.

In the honeycomb molded body end face treating apparatus 10, although the number of the above mentioned end face treatment units to be disposed is not particularly limited, it is preferable that 2 to 4 pairs of the above mentioned end face treatment unit be comprised therein. If the number of the above mentioned end face treatment units is within the above range (2 to 4 pairs), it is possible to improve the operation efficiency of the end face treatment, and also, it is possible to suppress increases of apparatus running costs and placement space.

Next, description will be given in regard to the sealing method of a honeycomb molded body according to an embodiment of the present invention.

A sealing method of a honeycomb molded body of according to an embodiment the present invention is a sealing method of a honeycomb molded body comprising:

filling a plug material paste into either end portion of cells of a honeycomb molded body in which a multitude of cells are placed in parallel with one another in the longitudinal direction with a cell wall therebetween so that a cell-sealed honeycomb molded body is formed; and flattening an end face of the cell-sealed honeycomb molded body by using a honeycomb molded body end face treating apparatus, the honeycomb molded body end face treating apparatus comprising:

a flat plate disposed so as to face the end face of the cell-sealed honeycomb molded body in a parallel manner; and a first flat plate movement mechanism for moving the flat plate while maintaining the state in which the flat plate faces the end face in a parallel manner, the first flat plate movement mechanism configured to move the flat plate so that the flat plate is pressed against the end face of the cell-sealed honeycomb molded body.

Since it is possible to optimally use the honeycomb molded body end face treating apparatus according to an embodiment of the present invention already described herein above as the honeycomb molded body end face treating apparatus used in the sealing method of a honeycomb molded body according to an embodiment of the present invention, detailed description of the constitution thereof will be omitted at this point, leaving description to the conditions, procedures, and the like of the flattening treatment.

Also, it is possible to optimally employ use of the honeycomb molded body intended for end face treatment carried out by the honeycomb molded body end face treating apparatus according to an embodiment of the present invention as the honeycomb molded body in question in the sealing method of a honeycomb molded body according to an embodiment of the present invention. Description of the process of carrying out sealing of the cells of this honeycomb molded body using a plug material paste will be covered in the description of the method for manufacturing a honeycomb structured body according to an embodiment of the present invention, while at this point the cell-sealed honeycomb molded body that has had the plug material paste filled to prescribed cells will be described as the item in question for the present sealing method of a honeycomb molded body.

In the above-mentioned honeycomb molded body end face treating apparatus, a weight at which the flat plate is to be pressed against the cell-sealed honeycomb molded body desirably is in the range of at least about 9.8N and at most about 49N (at least about 1 kgf and at most about 5 kgf).

If, as in the manner of the description of the honeycomb molded body end face treating apparatus according to an embodiment of the present invention set forth herein above, the above mentioned weight is in the above mentioned range, it is possible to carry out assured flattening of the end faces without causing deformation.

It is acceptable to change the period of time of pressing the flat plate 20 against the end face during end face treatment to correspond to weight at which pressing is carried out, the shape of the cell-sealed honeycomb molded body 1, and the like. For example, in a case of pressing the flat plate 20 against the end face at a weight of 29.4N (3 kgf), it is preferable that the period of time of pressing the flat plate 20 against the end face be in the range of 0.5 to 5 seconds. From the standpoint of workability it is preferable that the period of time of pressing the flat plate 20 against the end face be short.

If the period of time of pressing the flat plate 20 against the end face is less than 0.5 seconds it is not possible to carry out flattening treatment to a sufficient degree, while alternately, if the period of time of pressing the flat plate 20 against the end face is more than 5 seconds the achievable degree of flatness will not change, and also, there arises the concern that the end face will undergo deformation due to a cumulatively large amount of stress load applied to the end face.

The above-mentioned honeycomb molded body end face treating apparatus desirably further comprises: a second flat plate movement mechanism for moving the flat plate which is in a state of being pressed against the end face of the cell-sealed honeycomb molded body within the same plane that the flat plate occupies.

Although by solely moving the flat plate using the first flat plate movement mechanism to press the flat plate against the end face of the cell-sealed honeycomb molded body, the above mentioned end face is flattened sufficiently, if the second flat plate movement mechanism is disposed to move the above mentioned flat plate within the same plane that the flat plate occupies when it is in a state of being pressed against the end face of the above mentioned cell-sealed honeycomb molded body, it is possible to raise the degree of flatness in a case in which an even higher degree of flatness is desired.

The movement of the flat plate by the second flat plate movement mechanism within the same plane that the flat plate occupies and when the flat plate is in a state of being pressed against the end face of the above mentioned cell-sealed honeycomb molded body, can be rotational movement or horizontal movement, or a combination of both horizontal and rotational movement. However, when considering factors such as operational efficiency and apparatus complexity, it is preferable that the movement of the flat plate caused by the second flat plate movement mechanism within the above mentioned same plane the flat plate occupies be rotational movement.

In a case in which the movement of the flat plate caused by the second flat plate movement mechanism within the same plane that the flat plate occupies is rotational movement, it is preferable that the angle of rotation be in the range of at least about 10 degrees and at most about 150 degrees, and even more preferable in the range of at least about 10 degrees and at most about 90 degrees.

If the angle of rotation is less than about 10 degrees, flattened plug material comes to adhere to the flat plate. This adhered plug material makes it impossible to carry out further flattening, and is easily prone to peeling off of the adhered plug which gives rise to the concern that the end face will undergo deformation due to this influence.

Alternately, if the angle of rotation is great, stress builds in between the flat plate and the end face giving rise to the concern of deformation of the end face or the generation of cracking, and because of this it is preferable that the angle of rotation be about 150 degrees or less, and with an even more preferable angle of rotation of about 90 degrees or less it is possible to carry out flattening to a sufficient degree with no generation of cracking on the end face.

Because of this, if the above mentioned angle of rotation is in the range of at least about 10 degrees and at most about 90 degrees it is possible to carry out flattening of the end face in a precise manner.

Also, it is preferable that the angular speed at the time of the above mentioned rotational movement be in the range of at least about 2 rad/s and at most about 300 rad/s. By the angular speed of the rotational movement being in the above mentioned range it is possible to achieve flattening in an efficient manner while preventing deformation and the like of the end face.

The honeycomb molded body end face treating apparatus desirably further comprises: an adhered material removal mechanism for removing material adhering to a face of the flat plate which is to be pressed against the cell-sealed honeycomb molded body.

Since it is possible to thereby remove material adhering to the press face of the flat plate in an efficient manner it is possible to carry out continuous flattening treatment without the adhered material interfering with the subsequent flattening treatment.

In the honeycomb molded body end face treating apparatus, the face of the flat plate which is to be pressed against the cell-sealed honeycomb molded body desirably has a surface roughness Ra of at least about 0.04 μm and at most about 4.0 μm.

By the surface roughness being in the above mentioned range it is possible to carry out flattening of the end face with accuracy while suppressing necessary costs incurred in surface roughness adjustment.

Also, examples of methods of setting the surface roughness of the above mentioned flat plate within the above mentioned range include methods using buff polishing, whetstone, sheet or the like, for example.

Examples of the buff used in the above mentioned buff polishing include abrasive-grain containing buff such as disc-type buff, flap-type buff and whirl-type buff, and abrasive-grain-less buff such as polypropylene non-fibrous cloth and the like, for example. Examples of the abrasive grain used in the above mentioned abrasive-grain containing buff include aluminum silicate, aluminum oxide, silicon carbide and the like, for example.

Examples of the kinds of the above mentioned whetstone include resinoid whetstone (resinous material), magnesia whetstone (cement material), diamond whetstone, rubber control whetstone, epoxy control whetstone and the like, for example.

Also, it is for example possible to use a sheet containing sheet polish material of #A60 to A240 grade granularity as the sheet. More concretely, examples of the above mentioned sheet include urethane sponge, nylon non-fibrous cloth, acryl (sponge), or the like clad with whetstone such as aluminum silicate, aluminum oxide, silicon carbide, or the like for example.

On the end face of the flattened cell-sealed honeycomb molded body, the shortest distance L in between a plane surface comprising an end portion of the cell wall and a most protruded portion or a most recessed portion of the plug material paste with respect to the plane surface desirably is about 1 mm or less.

Figure 3:
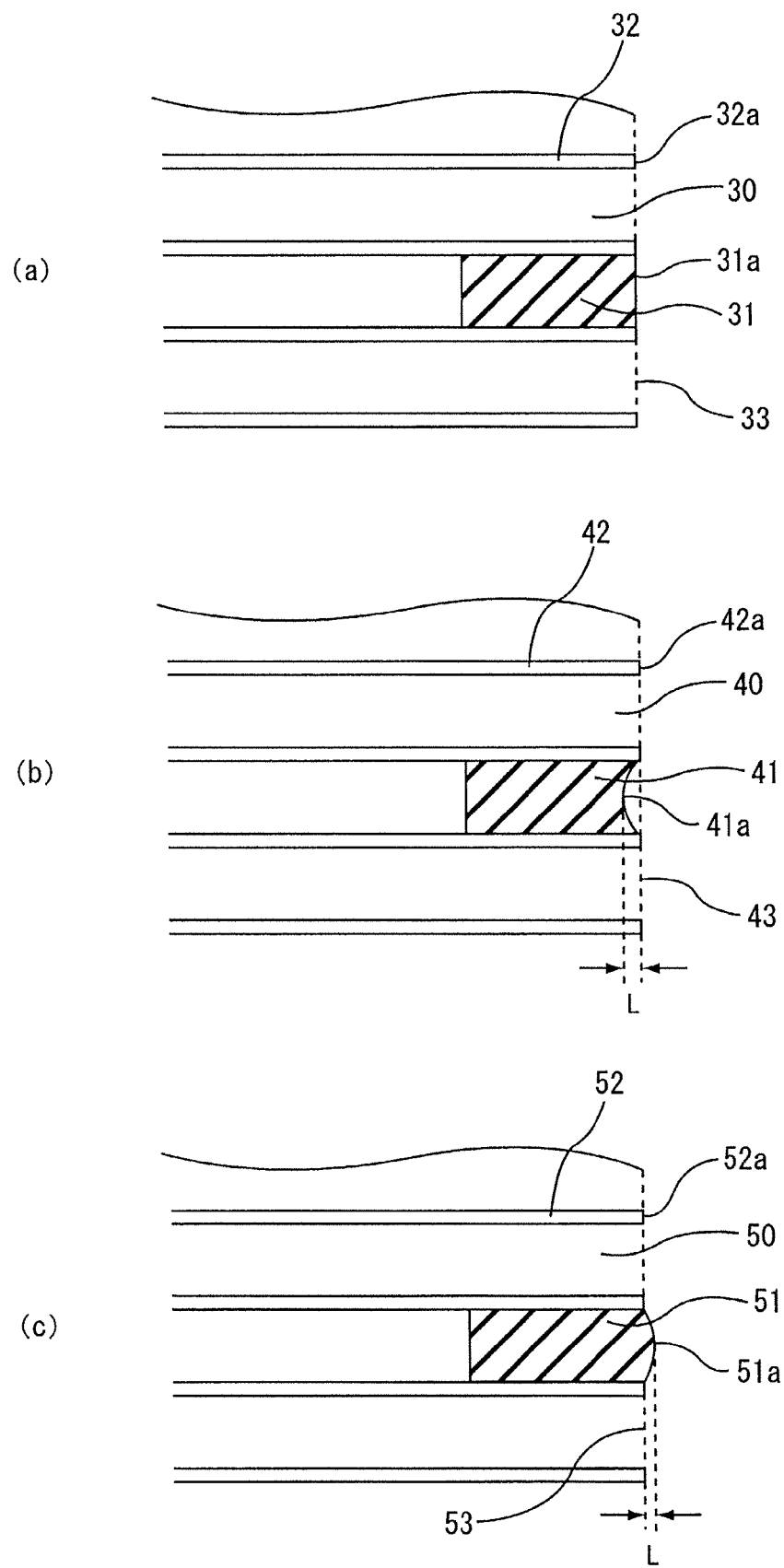
FIGS. 3(a) to 3(c) are partial enlarged views showing a cross section produced by cutting the cell-sealed honeycomb molded body at a plane surface parallel to the longitudinal direction in a manner so as to include sealed cells.

Description will be put forth in regard to an aspect of the flattened end face of this cell-sealed honeycomb molded body using FIGS. 3(a) to 3(c) as a reference.

FIGS. 3(a) to 3(c) are partial enlarged cross sectional views showing a cross section of a plane surface of the cell-sealed honeycomb molded body sectioned horizontally with respect to the longitudinal direction in a manner including the sealed cells. Each of the FIGS. 3(a) to 3(c) shows an aspect of cells 30, 40, and 50 which are partitioned by cell walls 32, 42, and 52, sealed by plug material pastes 31, 41, and 51, respectively.

In the cross section of the end face of the cell-sealed honeycomb molded body shown in FIG. 3(a) a plug end portion 31a of the plug material paste 31 lays within the same plane surface as a plane surface 33 comprising a cell wall end portion 32a of the cell wall 32, and is neither recessed nor protruded with respect to the plane surface 33. Therefore, in this case the shortest distance L in between the plane surface 33 comprising the cell wall end portion 32a of the cell wall 32, and the plug end portion 31a of the plug material paste 31 is 0 mm.

Next, in the cross section of the end face of the cell-sealed honeycomb molded body shown in FIG. 3(b) a plug end portion 41a of the plug material paste 41 is recessed with respect to a plane surface 43 comprising cell wall end portion 42a of the cell wall 42. In this case the distance L, shown in FIG. 3(b), is the shortest distance in between the plane surface 43 and the most recessed portion at the end portion of the plug material paste 41, i.e., the plug end portion 41a.

Also, in regard to the cross section of the end face shown in FIG. 3(c), a plug end portion 51a of the plug material paste 51 is protruded with respect to the plane surface 53 comprising a cell wall end portion 52a of the cell wall 52. Therefore in this case, the shortest distance in between the plane surface 53 and the most protruded plug end portion 51a which is the end portion of the plug material paste 51 is the distance L shown in FIG. 3(c).

If the shortest distance L regulated in this manner (herein below the shortest distance corresponding to the most protruded portion will be termed the 'amount of protrusion', and the shortest distance corresponding to the most recessed portion will be termed the 'amount of recession') is about 1 mm or less, the end face of the cell-sealed honeycomb molded body is flattened to a sufficient degree. And from this, not only does the end face exhibit a satisfactory external appearance, but in instances of placing the cell-sealed honeycomb molded body within a casing to be used as a honeycomb structured body honeycomb filter, it becomes possible to effectively prevent deformation, damage, or the like from occurring on the cell wall due to such protruded or recessed portions of the plug material paste.

Desirably, the honeycomb molded body end face treating apparatus used in the sealing method according to an embodiment of the present invention, is provided with two of the flat plates, and the first flat plate movement mechanism is configured to move each of the two flat plates so that each of the two flat plates are pressed against respective end faces at both ends of the cell-sealed honeycomb molded body.

As has already been explained using FIG. 1-1 and FIG. 1-2 as a reference, by the above mentioned honeycomb molded body end face treating apparatus being constituted in a manner configured to press two flat plates against both ends of the cell-sealed honeycomb molded body respectively, it is possible to carry out flattening of both end faces at one time while improving the efficiency and uniformity of the end face treatment. However, the number of flat plates to be comprised by the honeycomb molded body end face treating apparatus is not limited to two, as sufficient flattening can be carried out with only one flat plate as well.

Next, description will be given in regard to the method for manufacturing a honeycomb structured body according to an embodiment of the present invention.

The method for manufacturing a honeycomb structured body according to an embodiment of the present invention is a method for manufacturing a honeycomb structured body comprising a cell-sealed honeycomb fired body, comprising:

forming a pillar-shaped honeycomb molded body in which a multitude of cells are placed in parallel with one another in the longitudinal direction with a cell wall therebetween by carrying out extrusion-molding on a ceramic raw material;

sealing the honeycomb molded body by filling a plug material paste into either end portion of the cells of the honeycomb molded body to form a cell-sealed honeycomb molded body; and flattening an end face of the cell-sealed honeycomb molded body by using a honeycomb molded body end face treating apparatus; and firing the cell-sealed honeycomb molded body to produce the cell-sealed honeycomb fired body, the honeycomb molded body end face treating apparatus comprising:

a flat plate disposed so as to face the end face of the cell-sealed honeycomb molded body in a parallel manner; and a first flat plate movement mechanism for moving the flat plate while maintaining the state in which the flat plate faces the end face in a parallel manner, the first flat plate movement mechanism configured to move the flat plate so that the flat plate is pressed against the end face of the cell-sealed honeycomb molded body.

In the present specification, the shape indicated by the word "pillar" refers to any desired shape of a pillar including a round pillar, an oval pillar, a polygonal pillar and the like.

Figure 4:
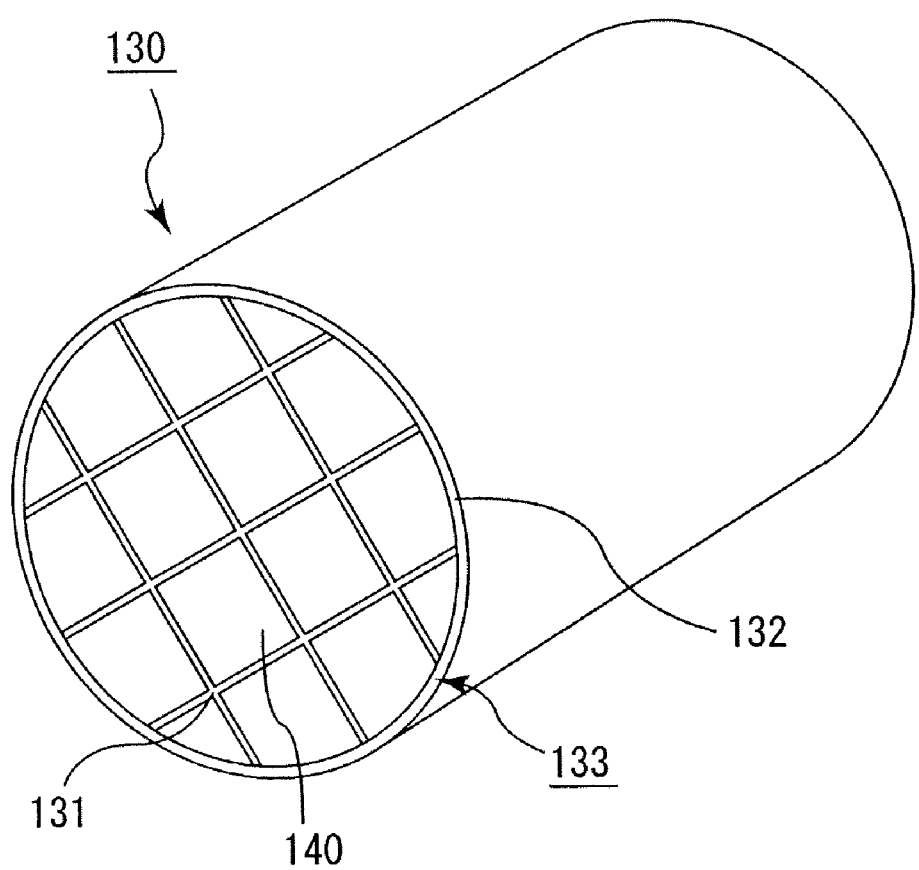
FIG. 4 is a perspective view schematically showing an example of a honeycomb structured body.

FIG. 4 is a perspective view schematically showing an example of a honeycomb structured body. FIG. 5(a) is a perspective view schematically showing a honeycomb fired body that comprises the above honeycomb structured body, while FIG. 5(b) is a cross-sectional view thereof, taken on line A-A.

In a honeycomb structured body 130, a plurality of honeycomb fired bodies 140 of the kind shown in FIGS. 5(a) and 5(b), are bound together by interposing a sealing material layer (an adhesive layer) 131 forming a ceramic block 133, and a sealing material layer (a coat layer) 132 is formed over the external circumference of the ceramic block 133.

And comprising the honeycomb fired body 140 are, as shown FIGS. 5(a) and 5(b), a multitude of cells 141 placed in parallel with one another in the longitudinal direction, and a cell wall 143, which separates the cells 141 from each other, and provide filtration functionality.

Figure 5:
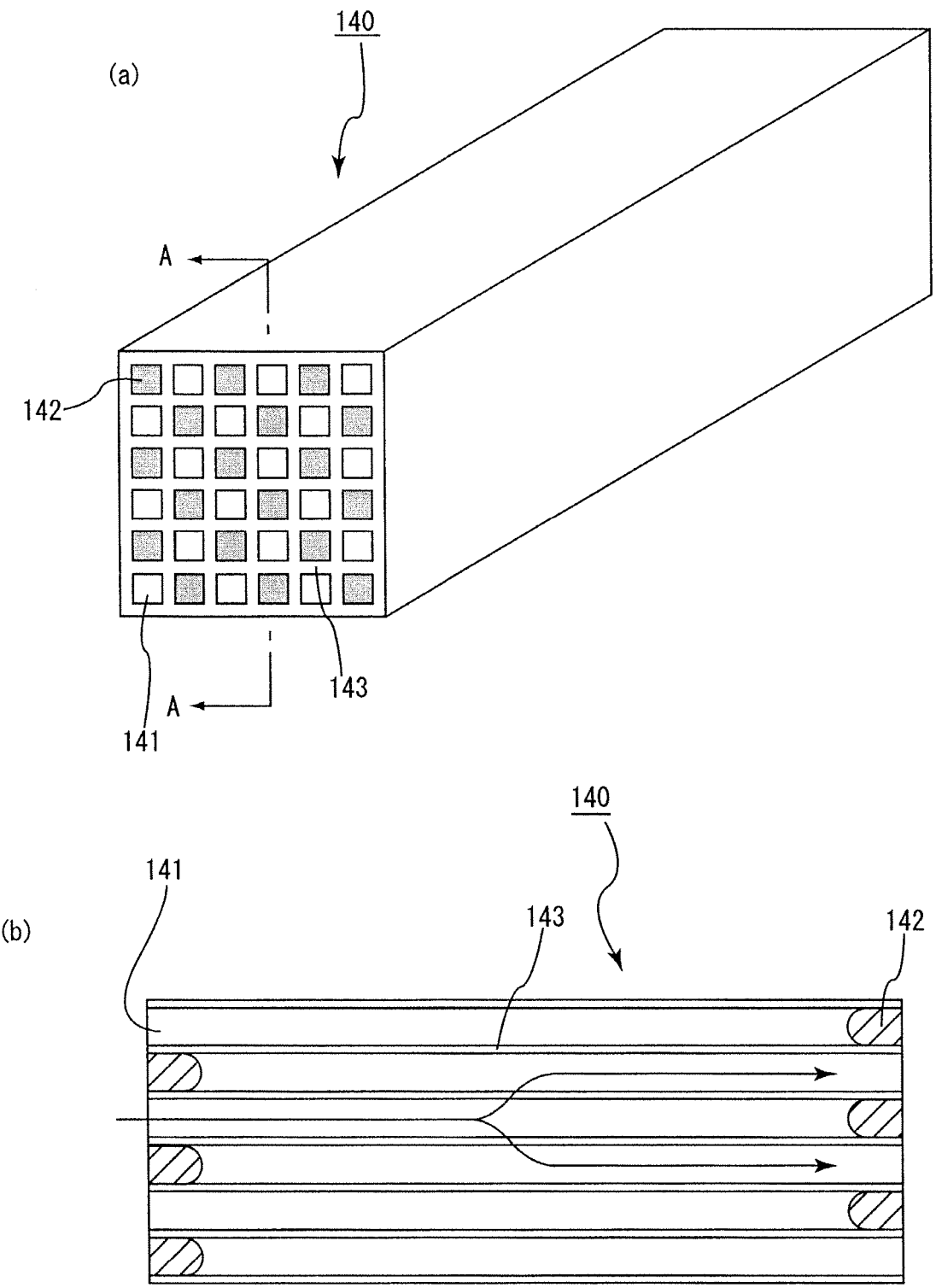
FIG. 5(a) is a perspective view schematically showing a honeycomb fired body constituting the honeycomb structured body.
FIG. 5(b) is a cross sectional view taken at line A-A of FIG. 5(a)

Put more plainly, as is shown in FIG. 5 (b), the end portion on either the entrance side or the exit side of the cells 141 formed in the honeycomb fired body 140 are sealed by a plug material layer 142. The exhaust gas which enters one of the cells 141 passes through the cell wall 143 which separates the cells 141 from each other, without fail, to flow out through other cells 141. When the exhaust gas passes through the cell wall 143 particulates contained within the exhaust gas are captured by the cell wall 143, thereby purifying the exhaust gas.

Below, the method for manufacturing a honeycomb structured body according to an embodiment of the present invention will be described in order of process.

At this point, using as an example a case of manufacturing a honeycomb structured body having silicon carbide as a main component of the constituent material, description will be put forth in regard to the method for manufacturing a honeycomb structured body in a case using silicon carbide powder as ceramic powder.

It is a matter of course that the main component of the constituent material of the honeycomb structured body is not limited to silicon carbide. Other examples of ceramic raw material include for instance, components such as nitride ceramics such as aluminum nitride, silicon nitride, boron nitride, titanium nitride; carbide ceramics such as zirconium carbide, titanium carbide, tantalum carbide, tungsten carbide; and oxide ceramics such as alumina, zirconia, cordierite, mullite, and aluminum titanate, and the like.

Out of the above mentioned possible components, non-oxide ceramics are desirably used, with silicon carbide being particularly desirable. This is because they are excellent in thermal resistance properties, mechanical strength, and thermal conductivity. Moreover, silicon-containing ceramic, which is obtained by infusing metallic silicon with the ceramics set forth above, as well as ceramic bound by silicon or silicate compounds can also be used as the constituting material of the honeycomb structured body. And out of these, those (silicon-containing silicon carbide) of ceramic obtained by infusing silicon carbide with metallic silicon are preferable.

First, organic binder is dry mixed with an inorganic powder such as silicon carbide powder of differing average particle diameters as the ceramic raw material. While the powder blend is being prepared, a solution blend is prepared of blended liquid plasticizer, lubricating agent, and water. Next, the above mentioned powder blend and the above mentioned solution blend are further blended together using a wet mixing machine, and thus a moist mixture for use in manufacturing the molded body is prepared.

Now although the particle diameter of the above mentioned silicon carbide powder is not particularly limited, a particle diameter exhibiting little shrinkage during the subsequent firing process is preferable. For example, a powder mix of a powder having 100 parts by weight with an average particle diameter in the range of 0.3 to 50 µm, and another powder having 5 to 65 parts by weight with an average particle diameter in the range of 0.1 to 1.0 µm, is desirable.

Although in order to adjust the pore diameter and the like of the honeycomb molded body, it is necessary to adjust the temperature at which firing takes place, the pore diameter can also be adjusted by adjusting the particle diameter of the inorganic powder.

The above mentioned organic binder is not limited in particular, and binders such as methylcellulose, carboxymethyl cellulose, hydroxyethyl cellulose, polyethylene glycol and the like, for example, are acceptable for use therein. Of the binders mentioned above, methylcellulose is the most preferable.

It is preferable that the above mentioned binder be blended with the inorganic powder at a ratio of 1 to 10 parts by weight of binder per 100 parts by weight of inorganic powder.

The above mentioned plasticizer is not limited in particular, and substances such as glycerin, for example, are acceptable for use as such.

The above mentioned lubricating agent is not limited in particular, and substances such as polyoxyalkylene based compounds such as polyoxyethelyne alkyl ether, and polyoxypropylene alkyl ether, for example, are acceptable for use as such.

Some concrete examples of lubricating agents are substances such as polyoxyethelyn monobutyl ether, and polyoxypropylene monobutyl ether.

Also, in some cases, it is unnecessary to use plasticizer or lubricating agent in the powdered material blend.

Also, when preparing the above mentioned moist mixture, it is acceptable to use a dispersant, and examples of such dispersant include water, organic solvents such as benzol and the like, and alcohol such as methanol and the like, for example.

Further, it is also acceptable to add a mold aiding agent to the above mentioned moist mixture.

The mold aiding agent is not limited in particular, and substances such as ethylene glycol, dextrin, fatty acid, fatty acid soap, poly alcohol and the like, for example, may be used.

Further, it is acceptable, according to need, to add a pore-forming agent such as balloon, which is a micro sized hollow sphere, spherical acrylic granule, graphite and the like, having oxide based ceramic as a component therein, to the above mentioned moist mixture.

The above mentioned balloon is not particularly limited, and material such as alumina balloons, glass micro balloons, shirasu balloons, fly ash balloons (FA balloons), mullite balloons, for example, are all acceptable for use. Of the above mentioned, alumina balloon is the most preferable for use.

Also, it is preferable for the temperature of the above prepared moist mixture, which uses silicon carbide, to be 28 Degrees Celsius or less. This is because if the temperature is too high, organic binder will undergo gelatinization.

It is also preferable for the inorganic ratio of within the above mentioned moist mixture to be 10% by weight or less, and it is also preferable for the moisture content weight of the same moist mixture to be in the range of 8.0 to 20.0% by weight.

After preparation, the above mentioned moist mixture is conveyed and then inducted into an extrusion molding machine.

After the conveyed moist mixture has been inducted into the extrusion molding machine, a ceramic molded body of prescribed shape is formed according to extrusion molding. This ceramic molded body is then cut to a prescribed length by a molded body cutting apparatus.

Next, the above mentioned honeycomb molded body is dried using a microwave drying apparatus, a hot air drying apparatus, a dielectric drying apparatus, a reduced pressure drying apparatus, a vacuum drying apparatus, a freeze drying apparatus, or the like, where it is made into a dried honeycomb molded body.

At this point, using a cutting apparatus, a cutting process is carried out to cut both ends of the manufactured honeycomb molded body to cut the honeycomb molded body to a prescribed length. According to doing so, any shrinkage of the honeycomb molded body that may have occurred during drying ceases to be an issue.

Then, the plug material paste is filled into either end portion of the cells of the above mentioned honeycomb molded body.

The filling in of the above mentioned plug material paste may be carried out using the honeycomb molded body cell opening-sealing apparatus of below, for example.

Figure 6:
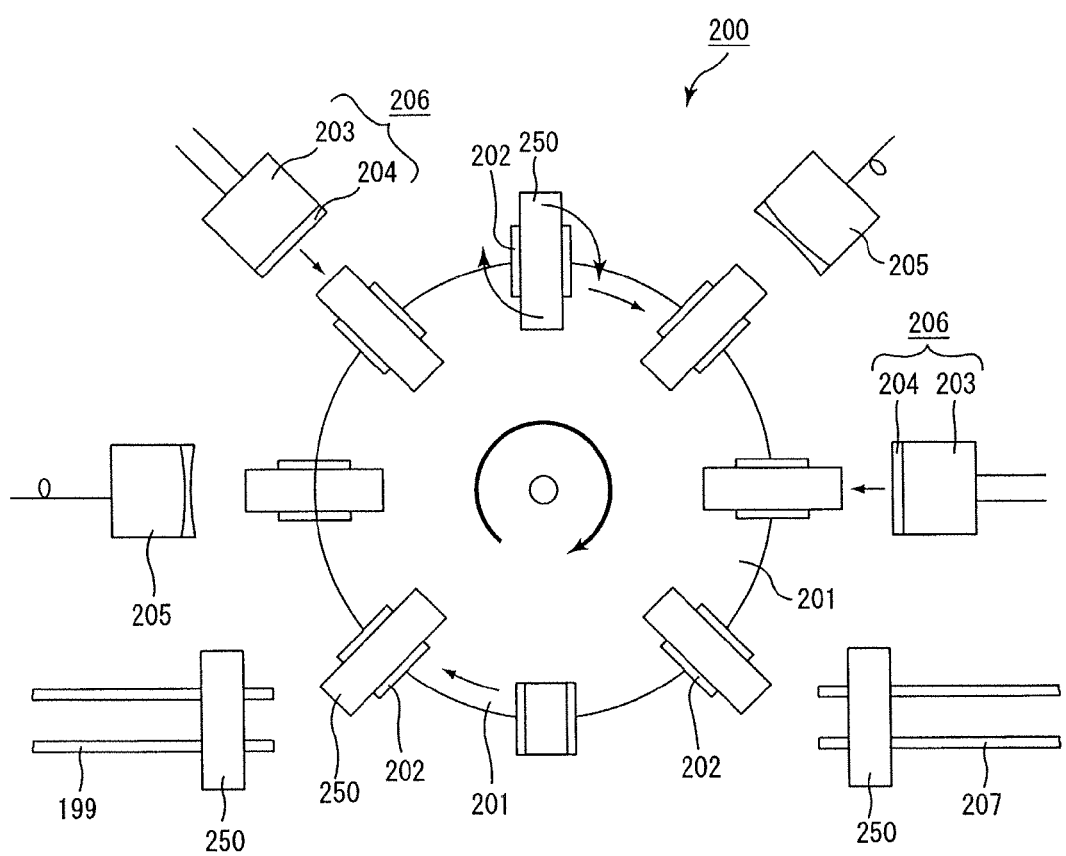
FIG. 6 is an outline view schematically showing a honeycomb molded body opening-sealing apparatus.
Figure 7:
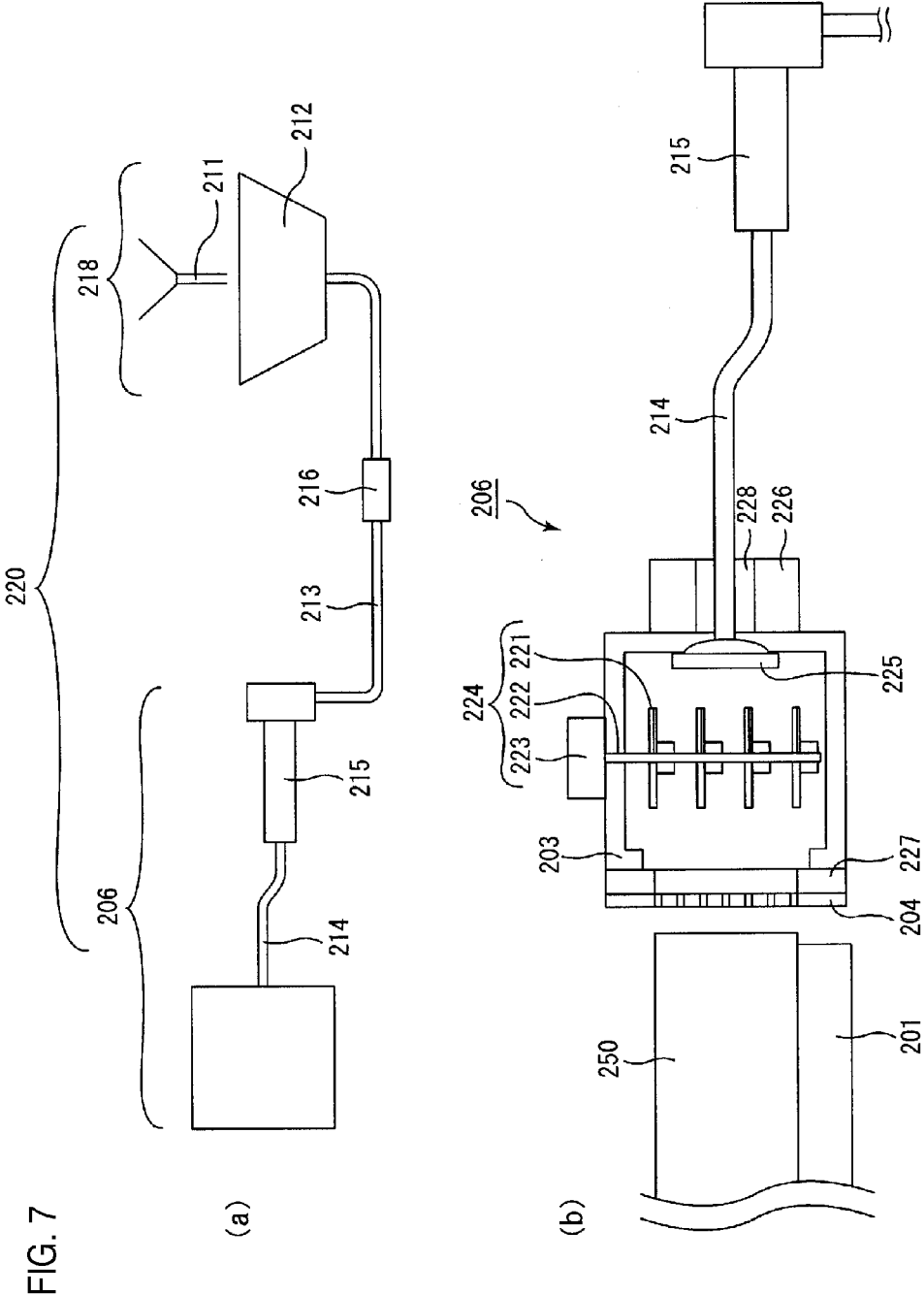
FIG. 7(a) is an outline view schematically showing a paste filling apparatus constituting the honeycomb molded body opening-sealing apparatus.
FIG. 7(b) is a partial enlarged view schematically showing a portion of the honeycomb molded body opening-sealing apparatus of FIG. 7(a)

FIG. 6 is an outline view schematically showing a honeycomb molded body cell opening-sealing apparatus, while FIG. 7(*a*) is an outline view schematically showing a paste filling apparatus constituting the honeycomb molded body cell opening-sealing apparatus. FIG. 7(*b*) is a partial enlarged cross sectional view schematically showing a portion of the honeycomb molded body cell opening-sealing apparatus of FIG. 7(*a*).

As shown in FIG. 6, a honeycomb molded body opening-sealing apparatus 200 comprises a rotary table 201, an image capture apparatus 205, and a paste filling portion 206. In detail, the rotary table 201 is configured to rotate and have placed thereon a honeycomb molded body 250, the image capture apparatus 205 is configured to photograph the end face of the honeycomb molded body 250, and the paste filling portion 206 contains a opening-sealing mask 204, a paste dispenser tank 203 and the like, and is configured to fill plug material paste into the end portions of cells of the honeycomb molded body 250.

The rotary table 201, having a rotational axis disposed in the vertical direction, is set to rotate horizontally, and has on it 8 molded body fixing portions 202 for firmly fixing the honeycomb molded body 250 to the rotary table 201. The rotary table 201 carries out intermittent rotational movement and the honeycomb molded body 250 is firmly fixed thereto by the molded body fixing portion 202, and opening-sealing treatment of the honeycomb molded body 250 is thereby conducted within a single rotation of the rotary table 201.

Here, although we observe an example of 8 units of the molded body fixing portion 202 being disposed to the rotary table 201, the number of units of the molded body fixing portion 202 is not particularly limited.

Also, the image capture apparatus 205 is disposed at two locations around the periphery of the rotary table 201, and two units of the paste filling apparatus containing the paste filling portion 206 are also disposed, enabling paste to be filed to the end portions of the cells after the different end faces of the honeycomb molded body 250 have been photographed.

When carrying out opening-sealing using this honeycomb molded body opening-sealing apparatus 200, first, a honeycomb molded body 250 conveyed by being placed on a conveyer 199 is situated into and firmly fixed to the molded body fixing portion 202 of the rotary table 201 constituting the honeycomb molded body cell plugging apparatus 200, by a robotic arm (not shown).

Next, the rotary table 201 rotates ⅛ th of a full rotation. When this happens, the end face of the honeycomb molded body 250 stops at a location facing the image capture apparatus 205 for photographing the same end face, where the end face of the honeycomb molded body 250 is then photographed by the image capture apparatus 205. The photograph captured image is immediately analyzed by an image analysis apparatus (not shown) connected to the image capture apparatus 205. The image analysis extracts the shape of the cells from the image, identifies the locations of the cells to be sealed while considering the slant and the like of the honeycomb molded body 250, compares the identified locations to the locations of the openings of the opening-sealing mask 204 used in sealing the cells, and calculates the location at which the location error of the openings of the opening-sealing mask 204 with the cells of the honeycomb molded body 250 is the least. More detailed description of this calculation process will be set forth at a later point herein below.

Next, the honeycomb molded body 250 to which photographing has been completed is rotated ⅛ th of a full rotation to stop at the next location. When this happens, the opening-sealing mask 204 is superimposed over the end face of the honeycomb molded body 250 at the location calculated in order that the location error between the openings of the opening-sealing mask 204 and the cells of the honeycomb molded body 250 is the smallest, and a plug material paste is thereby filled into the cells through the openings of the opening-sealing mask 204 to thereby seal the openings at the end face of the honeycomb molded body 250. The paste filling portion 206 is firmly fixed to a robotic arm comprising an angle adjustment member constituted in a manner which enables the x, y, z axes to be established in the locations that they have been set to.

Afterward, the rotary table 201 rotates ⅛ th of a full rotation. When this happens, the honeycomb molded body 250 firmly fixed to the molded body fixing portion 202 is lifted up by the robotic arm (not shown), and oriented in a manner that the end face with its openings sealed faces the center of the rotary table 201 and the end face with its openings yet to be sealed faces the outside. And the oriented honeycomb molded body 250 is then firmly fixed to the molded body fixing portion 202 once more.

After this, the rotary table 201 rotates ⅛ th of a full rotation. When this happens, the end face yet to be sealed is photographed by the image capture apparatus 205 in the same manner as in the above described operation. Next, after another ⅛ th rotation, the opening-sealing mask 204 is superimposed over the end face of the honeycomb molded body 250 at the location at which the location error between the openings of the opening-sealing mask 204 and the cells of the honeycomb molded body 250 is the smallest, and opening-sealing treatment is thereby carried out.

After yet another ⅛ th rotation, the honeycomb molded body 250 having the opening-sealing treatment carried out thereon is lifted up by a robotic arm not shown in the figures, and placed on a conveyer 207 of the next process.

In the present description, the term 'robotic arm' is used to refer to an arm comprising active joints having motors or the like, and according to necessity, further comprising passive joints having no motors or the like.

A more detailed description of the paste filling apparatus containing the paste filling portion 206 will reveal that the paste filling apparatus 220 as shown in FIG. 7(a) has the paste filling portion 206 and a paste supply portion 218 configured to supply plug material paste to the paste filling portion 206, and both the paste filling portion 206 and the paste supply portion 218 are joined together through a plug material paste supply tube 213. It is also acceptable to directly join the paste filling portion and the paste supply portion together without interposing a plug material paste supply tube therebetween.

The paste supply portion 218 comprises a paste supply hopper 211 and a paste discharge apparatus 212. In the paste supply portion 218, plug material paste conveyed in from the paste supply hopper 211, which has stored up a separately prepared plug material paste, is sent to the plug material paste supply tube 213 by the paste discharge apparatus 212 where it is further sent into the paste filling portion 206.

Also, there is a filter 216 interposed therein the plug material paste supply tube 213. And according to this filter 216, even if there are clumps present within the plug material paste it is possible to remove these clumps.

Also, although the size of the openings of the above mentioned filter is not particularly limited, it is preferable that they be in the size range of 0.1 to 1.0 mm.

The paste filling portion 206, as is shown in FIG. 7 (b), aside from the plugging mask 204 and the paste discharge tank 203, also comprises an agitation portion 224 constituted by an agitation blade 221, an agitation shaft 222, and a motor 223; a flow adjustment plate 225 disposed on the inlet side (the connection point had with a plug material paste supply tube 214) of the paste discharge tank 203; an angle adjustment member 226 and a temperature control member 228 disposed adjacent to the inlet side of the paste discharge tank 203; a shock absorption member 227 made of silicon rubber and interposed between the opening-sealing mask 204 and the paste discharge tank 203; a uniaxial eccentric screw pump (mono pump) 215; and a plug material paste supply tube 214 configured to join the uniaxial eccentric screw pump 215 with the paste discharge tank 203.

Then, the plug material paste sent from the paste supply portion 218 is first sent into the uniaxial eccentric screw pump 215, and from there, a fixed amount of the plug material paste is sent from the uniaxial eccentric screw pump 215 through the plug material paste supply tube 214 and the flow adjustment plate 225 to the paste discharge tank 203 where it is then filled into prescribed cells of the honeycomb molded body 250 through the opening-sealing mask 204 superimposed over the targeted end face of the honeycomb molded body 250.

Also, in the agitation portion 224 disposed in the paste discharge tank 203, the agitation shaft 222 and the agitation blade 221 are constituted in a manner configured to rotate. Then, according to filling in the plug material paste while rotating the agitation blade 221, it is possible to make uniform the temperature of the plug material paste inside of the paste discharge tank 203 which also results in the viscosity of the plug material paste becoming uniform, and because of this the plug material paste is filled into the prescribed cells in a uniform manner.

Also, in the paste filling portion 206, the angle adjustment member 226 and the temperature control member 228 are disposed adjacent to one another on the paste discharge tank 203.

So when superimposing the paste discharge tank 203 over the end face of the honeycomb molded body 250, it is possible to adjust the opening-sealing mask 204 to be superimposed over the target end face of the honeycomb molded body 250 at a prescribed position by the angle adjustment member 226.

Also, because a heater is housed inside of the temperature control member 228 it is possible to control the temperature of the plug material paste to a prescribed temperature by this temperature control member 228.

Examples of the material of the opening-sealing mask 204 include metals such as stainless or nickel, resins such as epoxy resin, and ceramic or the like.

Also, openings of circular shape or shapes having R-chamfered or C-chamfered angle portions are formed on the plugging mask 204 in correspondence to the cells to be filled with plug material paste.

Here, it is preferable that the surface area of an individual opening of the opening-sealing mask be smaller than the surface area of its corresponding cell. This is because even if the position of the opening of the opening-sealing mask deviates slightly from the position of its corresponding cell, it still remains possible to assuredly fill the plug material paste only into the corresponding cell while preventing the plug material paste from adhering to the end face (the end portion of the cell) of the honeycomb molded body. And since the plug material paste has a degree of fluidity, even if the opening of the opening-sealing mask is smaller then the cell opening it is still possible to assuredly fill the plug material paste into the cell.

Also, in the honeycomb molded body opening-sealing apparatus 200, the opening-sealing mask 204 is disposed having the shock absorption member 227 made from silicon rubber or the like interposed between the plugging mask 204 and the rest of the apparatus.

Also, in the honeycomb molded body opening-sealing apparatus 200, the flow adjustment plate 225 is disposed on the inlet side (the side opposite the side on which the opening-sealing mask is disposed) of the paste discharge tank 203.

By disposing the flow adjustment plate 225 it is possible to make uniform the inductance flow speed of the plug material paste inside of the paste discharge tank 203 with a central portion and a rim portion of the inlet, which, in cases filling the plug material paste into cells, results in it being possible to make uniform the amount of plug material paste filled into each cell.

Figure 8:
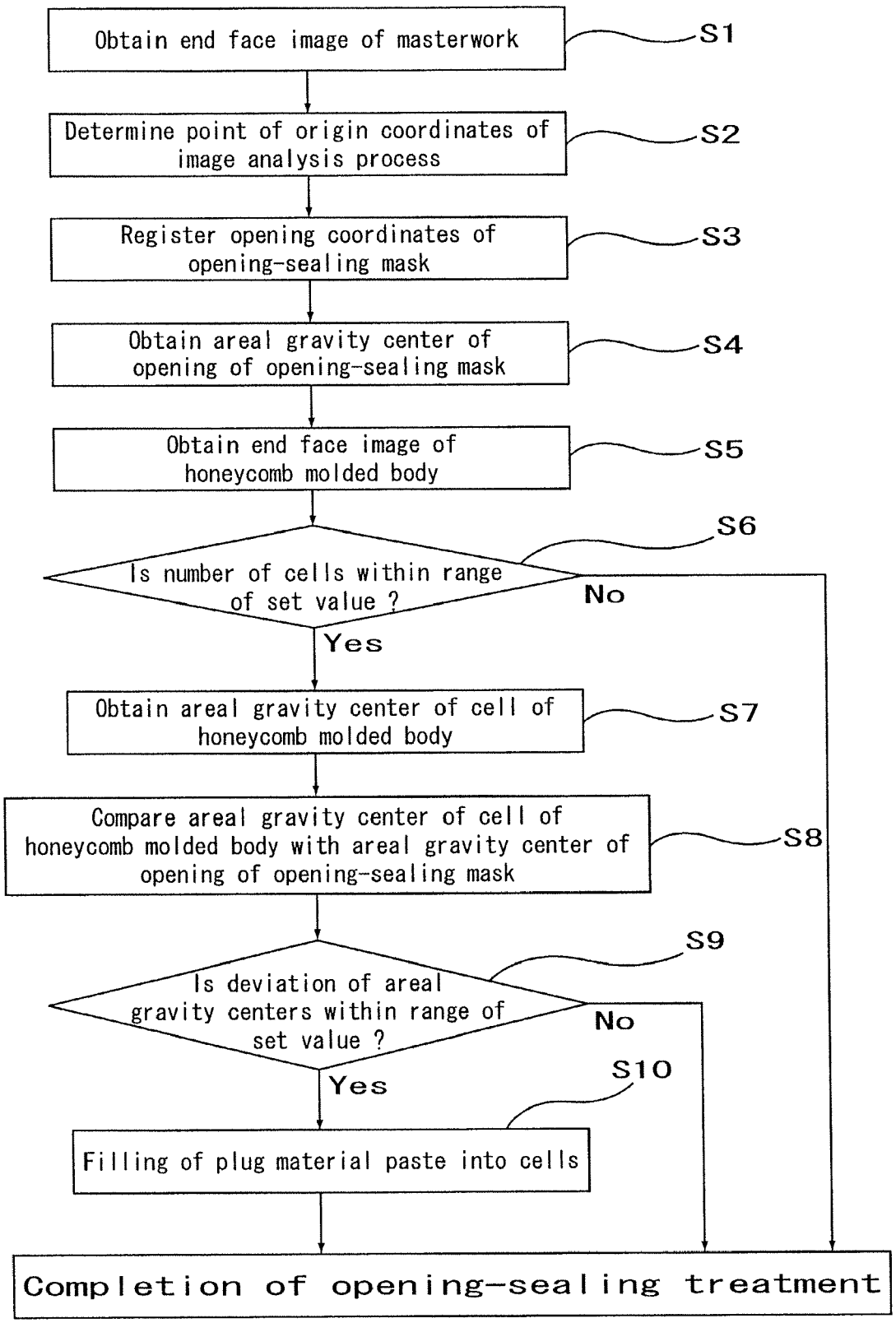
FIG. 8 is a flowchart showing a process (a means) flowing from the analysis of the image of the end faces of the honeycomb molded body to the filling in of the plug material paste.

Next, while referencing a flowchart description will be set forth in regard to a method of analysis of the image obtained by the above mentioned image capture apparatus using an image analysis apparatus, and a method of filling plug material paste to cells based on the result of image analysis. FIG. 8 is a flowchart showing the process (a means) spanning from the stage of analysis of the image of the end face of the honeycomb molded body to the stage of filling plug material paste into cells.

(a) Firstly, a masterwork having the same exterior shape as a honeycomb molded body aside from a point of having no cells and also having a plurality of bottomed holes formed on the end faces is firmly fixed to the molded body fixing portions 202 of the honeycomb molded body opening-sealing apparatus 200 as a reference sample, and an image of the targeted end face of this masterwork having bottomed holes formed therein is captured (step S1), and the point of origin coordinates are determined according to registering coordinates of the formation points of the bottomed holes in the image analysis apparatus (step S2).

(b) Next, using the point of origin coordinates decided in the above mentioned (a) process as a reference, the positions of the openings formed on the opening-sealing mask are then registered in the image analysis apparatus (step S3).

Further, based on the opening positions registered in the step S3 and the size thereof, the areal gravity center of the openings formed on the opening-sealing mask is obtained (step S4).

In the above mentioned image analysis apparatus the above mentioned processes (a) and (b) are executed before filling the plug material paste into the cells.

(c) Next, imagery of the targeted end face of the honeycomb molded body firmly fixed to the molded body fixing portions 202 of the honeycomb molded body opening-sealing apparatus 200 and moved following the rotation of the rotary table 201 is captured, and then it is registered in the image analysis apparatus (step S5).

Then the captured image of the end face is analyzed in the above mentioned image analysis apparatus whereby the number of cells differing with design is calculated. And in a case in which that number is greater than a prescribed number, it is determined whether the honeycomb molded body in question is a faulty product; thus, the faulty product is separated from good product by determining other honeycomb molded bodies as good products (step S6).

Then, the next process, a step S7 is carried out on the honeycomb molded bodies that are determined to be good product. However regarding the honeycomb molded bodies that are determined to be faulty product, the opening-sealing treatment is at this point ended without carrying out the subsequent plug material paste filling process thereon.

(d) Next, binarization is carried out on the imagery of the end faces of the honeycomb molded bodies that are determined to be good product, and the areal gravity center of each cell is obtained based upon the image obtained according to the binarization (step S7). Now, before and after the above mentioned binarization process, it is acceptable to conduct various kinds of filter processing to the above mentioned image of the end face according to necessity in order to clarify the outline of each cell as much as possible.

(e) Next, the amount of deviation of the areal gravity center of the openings of the opening-sealing mask obtained in the above mentioned step S4 from the areal gravity center of each cell obtained in the above mentioned step S7 is calculated using the least square method (step S8).

Here, it is acceptable for the openings and cells which are the subject of calculation of the amount of deviation of the areal gravity center of the openings of the opening-sealing mask from the areal gravity center of the cells of the honeycomb molded body to be the entire count of the openings and the cells, as it is also acceptable to be a only portion of the openings and cells, for instance, all openings and cells aside from the two outermost rows of openings and cells.

Then, in a case in which there exists a cell in which the above mentioned amount of deviation exceeds a prescribed value, the honeycomb molded body in question is determined to be a faulty product; thus, the faulty product is separated from good product by determining other honeycomb molded bodies as good products (step S9).

Then the next process, a step S10, is carried out on the honeycomb molded bodies determined to be good product. However regarding the honeycomb molded bodies determined to be faulty product, the opening-sealing treatment is at this point ended without carrying out the subsequent process of filling plug material paste into the cells.

(f) Next, based upon the amount of deviation from the areal gravity center calculated in the above mentioned process (e), the opening-sealing mask (paste discharge tank 203) is moved while aligning the position of the opening-sealing mask to thereby superimpose the opening-sealing mask over the targeted end face of the honeycomb molded body, and plug material paste is filled into the cells of the honeycomb molded body (step S10) from the paste discharge tank 203 thereby completing the opening-sealing of one end face of the honeycomb molded body.

The position alignment of the opening-sealing mask can be conducted by the angle adjustment member 226.

Also, although here the position alignment of the opening-sealing mask with the cells is conducted based upon the amount of deviation from the areal gravity center calculated in the above mentioned step S8, it is also acceptable, for example, in cases in which the amount of deviation of all openings and cells except the two outermost rows of openings and cells has been calculated, to conduct position alignment with a separate means for the outer two rows after position alignment has been conducted based upon the amount of deviation from the above mentioned areal gravity center.

Because the operations of the above mentioned processes of (a) to (f) are operations to be carried out to a single end face of the honeycomb molded body, in cases of filling plug material paste to both end faces of the honeycomb molded body the above mentioned processes of (a) to (f) are to be executed repeatedly.

Also, in the honeycomb molded body opening-sealing apparatus 200, although the filling of the plug material paste is carried out on the honeycomb molded body which is firmly fixed to the prescribed position of the molded body fixing portions 202 disposed on the rotary table, this fixed position may come to deviate. In such cases in which this fixed position has come to deviate, since there is a concern that even a honeycomb molded body that has been confirmed to be of a prescribed shape in the above mentioned steps of S6 and S8 may be determined to be a faulty product, it is preferable that inspection be made on whether or not the honeycomb molded body is indeed firmly fixed at the prescribed position of the molded body fixing portions 202 before conducting the processes spanning from the analysis of the end face of the honeycomb molded body to the filling of plug material paste into cells.

And in this case, although it is acceptable to carry out examination each time the honeycomb molded body is firmly fixed to the molded body fixing portion 202, it is preferable that examination be carried out in a proportion of 1 to a plurality of honeycomb molded bodies.

In a case of conducting the filling in of plug material paste with this kind of method, it is preferable that the temperature of the above mentioned plug material paste is in the range of 30 to 110 Degrees Celsius. If the temperature of the plug material paste is less than 30 Degrees Celsius there are cases in which the plug material paste cannot be filled into the cells due to it being easy for the viscosity of the plug material paste to become high, and alternately, if the temperature of the plug material paste exceeds 10 Degrees Celsius because at this temperature it is easy for the viscosity of the plug material paste to become low, giving rise to the concern that the ability of the filled plug material paste to maintain its shape deteriorates.

It is preferable for the viscosity of the above mentioned plug material paste to be in the range of 35 to 50 Pa·s (Measured temperature 25 Degrees Celsius). At a viscosity of less than 35 Pa·s, the fluidity of the plug material paste becomes too high, giving rise to cases in which it is not possible to assuredly seal the cells due to the plug material paste coming to flow in toward the interior portion of the cell of the honeycomb molded body when filled into the cell. Alternately, at a viscosity exceeding 50 Pa·s, it is easy for the plug material paste to become clogged in the opening-sealing mask or the filter, and thus there are cases in which it is not possible to conduct filling of the plug material paste into the cells of the honeycomb molded body in an assured manner.

Also, the method of filling the plug material paste into the honeycomb molded body is not limited to the method of using a honeycomb molded body opening-sealing apparatus having the constitution described above, as it is also acceptable to conduct the filling of plug material paste into prescribed cells of a honeycomb molded body with an arbitrary method.

Although the above mentioned plug material paste is not particularly limited, one manufactured through the following processes that will come to have a plug porosity in the range of 30 to 70% is desirable, such as one using the same material as the above mentioned moist mixture, for example. Further, it is acceptable to adjust the filling amount of the plug material paste according to the shape of cells, and characteristics required for the plug material layer.

In the above mentioned plug material paste drying process, the plug material paste is dried using a hot air drying apparatus.

Although the above mentioned hot air drying apparatus itself is not particularly limited as long as it is able to blow hot air to the end faces of a honeycomb molded body to which plug material paste has been filled, it is preferable to use a hot air drying apparatus comprising a conveyer member and hot air blow holes inside of a drying furnace, and these hot air blow holes are desirably formed at locations facing the end faces of the above mentioned honeycomb molded body.

Figure 9:
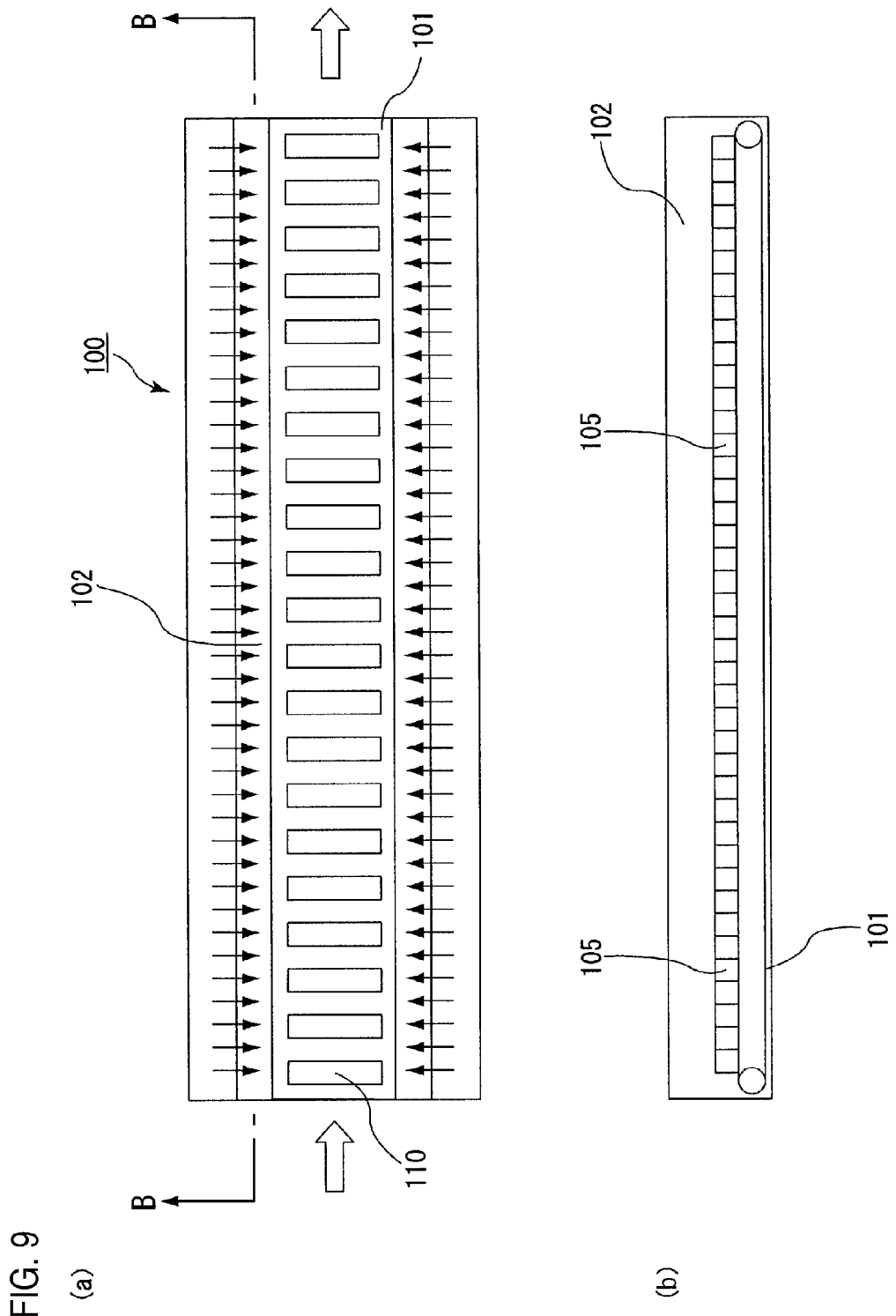
FIG. 9(a) is a plan view schematically showing the interior of the hot air drying apparatus used in the plug material paste drying process of the method for manufacturing a honeycomb structured body according to the embodiment of the present invention.
FIG. 9(b) is a cross sectional view taken at line B-B of FIG. 9(a).

It is possible for example to use a hot air drying apparatus or the like of the aspects shown in FIGS. 9(a) and 9(b) as the hot air drying apparatus having this kind of a constitution.

FIG. 9(a) is a plan view schematically showing the interior of a hot air drying apparatus used in drying of the plug material paste with the method for manufacturing a honeycomb structured body according to an embodiment of the present invention, while FIG. 9(b) is a cross sectional view taken along line B-B of FIG. 9(a).

Established in the hot air drying apparatus 100 shown in FIGS. 9(a) and 9(b) is a belt conveyer 101 configured to function as a conveyance member on the floor portion of a drying furnace 102. A honeycomb molded body 110 is placed on the belt conveyer 101 in a manner in which the longitudinal direction of the honeycomb molded body 110 is oriented in the direction orthogonal to the direction of movement. This honeycomb molded body 110 is conveyed into the interior of the hot air drying apparatus 100 through the entryway, and after a prescribed period of time has passed, is conveyed out through the exit of the hot air drying apparatus 100. The movement of the belt conveyer 101 here is set to be carried out at a constant rate of speed.

And in this hot air drying apparatus 100, hot air blow holes 105 are disposed in rows spanning the entirety of the interior of the drying oven 102 on both sides of the belt conveyer 101 at locations facing the end faces of the honeycomb molded body 110.

Thus, hot air blown from the air blow holes 105 toward the honeycomb molded body 110 dries the plug material paste.

More specifically, the honeycomb molded body 110 placed on the belt conveyer 101 moves through the hot air drying machine 100 following the movement of the belt conveyer 101, and the plug material paste formed at the end portions of the cells of the honeycomb molded body 110 is dried by the hot air blown from both sides of the belt conveyer.

The hot air drying machine 100 shown in FIGS. 9(a) and 9(b) has a constitution enabling hot air to be blown to both end faces of the honeycomb molded body 110 simultaneously.

According to blowing hot air to both end faces of the honeycomb molded body 110 simultaneously, both end portions (surface) of the plug material paste filled into the cells of the honeycomb molded body come to be dried first, so even if the plug material paste on the inside of the honeycomb molded body has fluidity at the stage of the first drying, both end portions of the plug material paste are in a hardened state.

Because of this, at the time when drying of the plug material paste progresses further, or in the honeycomb molded body degreasing or firing treatments of subsequent processes, it is possible to carry out drying, degreasing, and firing to a desired shape with no occurrences of concavity (recession) in the plug material paste.

In the process of carrying out drying of the above mentioned plug material paste, although it is preferable according to the above described reason to carry out the blowing of hot air to both end faces of the honeycomb molded body 110 simultaneously, in an embodiment of the present invention it is preferable to carry out the blowing of hot air to one side of the honeycomb molded body 110 at a time. However, in a case of carrying out blowing of hot air to one side of the honeycomb molded body 110 at a time, there is a concern that concavity (recession) will occur on the plug material paste end portion out of both end portions of the plug material paste, which lays on the side opposite of the side of the plug material paste end portion to which hot air is first blown.

Also, in this process, it is preferable that the temperature of the hot air blown to the end faces of the honeycomb molded body be in the range of 140 to 210 Degrees Celsius.

If the above mentioned hot air temperature is less than 140 Degrees Celsius, the plug material paste does not dry sufficiently which leads to cases in which after drying, the plug material paste will start to flow, and after the completion of the subsequent firing process, it becomes impossible to form a plug material layer of desired shape. Alternately, if the temperature of the hot air is more than 210 Degrees Celsius, there are cases in which the drying of the plug material paste comes to advance sharply, cases in which drying itself becomes excessive, and cases of concavities (recesses) or cracks coming to be generated in the plug material paste.

Also, it is preferable that the period of time over which the above mentioned hot air is blown be in the range of 2 to 7 minutes.

If the above mentioned period of time over which the above mentioned hot air is blown is less than 2 minutes, the plug material paste does not dry sufficiently which leads to cases in which after drying, the plug material paste will start to flow, and after the completion of the subsequent firing process, it becomes impossible to form a plug material layer of desired shape. Alternately, if the above mentioned period of time over which the above mentioned hot air is blown is more than 7 minutes, there are cases of concavities (recesses) or cracks coming to be generated in the plug material paste due to excessive drying of the plug material paste, cases in which drying itself becomes excessive, and cases in which degreasing of the plug material paste and the honeycomb molded body advances thereby making brittle portions at which degreasing has advanced.

In the embodiments of the present invention, the term 'period of time over which hot air is blown' in the drying process of the above mentioned plug material paste refers to the total period of time over which hot air is blown to the end faces of the honeycomb molded body. For example, in a case in which hot air blow holes are established in rows spanning the entirety, i.e., through the entryway side to the exit side, of the interior of the hot air drying apparatus as shown in FIGS. 9(a) and 9(b) at locations facing the end faces of the honeycomb molded body, the period of time spent passing through the interior of the drying furnace equates to the period of time over which hot air is blown to the honeycomb molded body.

Also, it is preferable that the wind speed at which the above mentioned hot air is blown be in the range of 10 to 30 m/sec.

This is because, in a case in which the above mentioned hot air is blown at a wind speed of less than 10 m/sec, there arise cases in which the plug material paste does not dry sufficiently. And alternately, in a case in which the above mentioned hot air is blown at a wind speed of more than 30 m/sec, there arise cases in which the formed plug material paste undergoes deformation due to the blown air being too fast.

Although the movement speed of the above mentioned belt conveyer may be selected in consideration of the size of the honeycomb molded body 110, it is preferable that the movement speed of the above mentioned belt conveyer be in the range of 0.4 to 1.0 m/min.

If the movement speed of the above mentioned belt conveyer is less than 0.4 m/min, the honeycomb molded body remains inside the hot air drying apparatus for some time even after it has been sufficiently dried, which makes it impossible to carry out drying in an efficient manner. And alternately, if the movement speed of the above mentioned belt conveyer is more than 1 m/min, there arise cases in which it is impossible to carry out sufficient drying of the plug material paste since the belt conveyer is moving too fast.

Also, although the hot air drying machine 100 shown in FIGS. 9(a) and 9(b) comprises a belt conveyer as a conveyance member, the conveyance member comprised by the hot air drying apparatus used in the manufacturing method of the present invention is not limited to being a belt conveyer, and may instead be a chain conveyer, a roller conveyer, a palette conveyer, or the like for instance.

Further, in the above-mentioned hot air drying apparatus, it is acceptable that the conveyance member moves continuously or intermittently.

When the conveyance member is configured to move intermittently, the speed thereof may be set to a constant rate of speed or may be changed while the conveyance member is moving.

In the hot air drying apparatus shown in FIGS. 9(a) and 9(b), although the hot air blow holes are formed spanning the entirety of the drying furnace from the entryway side to the exit side, in the hot air drying apparatus used in the manufacturing method according to an embodiment of the present invention, the above mentioned hot air blow holes are not necessarily formed spanning the entirety of the drying oven from the entryway side to the exit side, as it is also acceptable to form the hot air blow holes in a manner leaving space intervals in between adjacent hot air blow holes.

In the method for manufacturing a honeycomb structured body according to an embodiment of the present invention, flattening treatment is carried out to the end faces of a cell-sealed honeycomb molded body sealed in this manner by the honeycomb molded body end face treating apparatus.

Now for drying the plug material paste filled into the cells, although it is acceptable to carry out drying according to hot air as in the above manner, drying is not limited to being carried out according to hot air, as it is acceptable to carry out drying of the plug material paste by heating the flat plate used for flattening the end face of the cell-sealed honeycomb molded body, and pressing this heated flat plate up against the above mentioned end faces while carrying out hot air drying, or without carrying out hot air drying at all, after the plug material paste has been filled into the cells. As for the method of heating the flat plate, it is possible to use a method of implanting a heating mechanism such as a heater or the like inside of the flat plate and thereby carry out heating of the flat plate from heat within the implanted heater.

The above mentioned honeycomb molded body end face treating apparatus comprises: a flat plate disposed so as to face the end face of the cell-sealed honeycomb molded body in a parallel manner; and a first flat plate movement mechanism for moving the flat plate while maintaining the state in which the flat plate faces the end face in a parallel manner, the first flat plate movement mechanism configured to move the flat plate so that the flat plate is pressed against the end face of the cell-sealed honeycomb molded body.

It is possible to optimally use the honeycomb molded body end face treating apparatus already described herein above as the honeycomb molded body end face treating apparatus used in this manner in the present manufacturing method, and it is also possible to optimally employ the use of the sealing method of a honeycomb molded body according to an embodiment of the present invention as the method of carrying out flattening using this honeycomb molded body end face treating apparatus.

In the method for manufacturing a honeycomb structured body according to an embodiment of the present invention, the honeycomb molded body end face treating apparatus desirably further comprises:

a second flat plate movement mechanism for moving the flat plate which is in a state of being pressed against the end face of the cell-sealed honeycomb molded body within the same plane that the flat plate occupies.

By using the second flat plate movement mechanism to move the flat plate within the same plane it occupies while the flat plate is in the state of being pressed against the end face of the honeycomb molded body it is possible to further carry out uniform and sufficient flattening to the end face.

The honeycomb molded body end face treating apparatus desirably further comprises: an adhered material removal mechanism for removing material adhering to a face of the flat plate which is to be pressed against the cell-sealed honeycomb molded body.

Since it is possible to thereby remove material adhering to the flat plate upon end face treatment in an efficient manner it is possible to carry out continuous end face treatment without remaining adhered material interfering with the subsequent end face treatment.

In the honeycomb molded body end face treating apparatus, the face of the flat plate which is to be pressed against the cell-sealed honeycomb molded body desirably has a surface roughness Ra of at least about 0.04 µm and at most about 4.0 µm.

By the surface roughness Ra being in the above mentioned range it is possible to carry out flattening of the end face of the cell-sealed honeycomb molded body in a precise manner while suppressing necessary polishing costs incurred in surface roughness adjustment.

In the honeycomb molded body end face treating apparatus, a weight at which the flat plate is to be pressed against the cell-sealed honeycomb molded body desirably is in the range of at least about 9.8N and at most about 49N (at least about 1 kgf and at most about 5 kgf).

If the above mentioned weight is in the above mentioned range, it is possible to carry out effective flattening of the end faces while suppressing deformation of the end face of the cell-sealed honeycomb molded body, or the cell-sealed honeycomb molded body itself.

In the method for manufacturing a honeycomb structured body according to an embodiment of the present invention, on the end face of the flattened the cell-sealed honeycomb molded body, the shortest distance in between a plane surface comprising an end portion of the cell wall and a most protruded portion or a most recessed portion of the plug material paste with respect to the plane surface desirably is about 1 mm or less.

If the plug material paste exhibits this kind of shape, it is possible to attain an excellent external appearance, and it is also possible to prevent the kind of damage that may arise from accidental contact or the like on protruded or recessed portions of the plug material paste.

The honeycomb molded body end face treating apparatus desirably is provided with two of the flat plates, and the first flat plate movement mechanism is configured to move each of the two flat plates so that each of the two flat plates are pressed against respective end faces at both ends of the cell-sealed honeycomb molded body.

With a constitution in this manner, it is possible to uniformly and effectively carry out flattening of the cell-sealed honeycomb molded body with a one-time end face treatment.

Next, for example, by carrying out degreasing (at 200 to 500 Degrees Celsius, for example) and firing (at 1400 to 2300 Degrees Celsius, for example) under prescribed conditions to a cell-sealed honeycomb molded body sealed with the above mentioned plug material paste, it is possible to manufacture a cell-sealed honeycomb fired body (see FIGS. 5(a) and 5(b)) in which one of the end portions of the above mentioned cells are sealed, the same honeycomb fired body comprising a multitude of cells placed in parallel with one another in the longitudinal direction with a cell wall therebetween, and which is constituted as a single fired body as a whole.

On the end face of the cell-sealed honeycomb fired body, the shortest distance in between the plane surface comprising the end portion of the cell wall and the most protruded portion or the most recessed portion of the plug material paste with respect to the plane surface desirably is about 1 mm or less.

If the end portion of the plug material paste on the end faces of the above mentioned cell-sealed honeycomb fired body fulfill a relationship of the sort mentioned above, it is possible to ultimately produce a honeycomb structured body, using the cell-sealed honeycomb fired body, having its end faces in a picturesque state. Also, when producing a honeycomb filter using the above mentioned honeycomb structured body, it is possible to effectively prevent the end faces of the honeycomb structured body from being damaged when situating the honeycomb structured body inside of the casing.

The above mentioned conditions under which degreasing and firing are carried out on the above mentioned cell-sealed honeycomb molded body can be the same conditions that have been used conventionally when manufacturing a filter comprising porous ceramic.

Next, a sealing material paste layer is formed by coating the side face of the cell-sealed honeycomb fired body with a sealing material paste, which is to be a sealing material layer (adhesive layer), of uniform thickness, and another cell-sealed honeycomb fired body is stacked to this sealing material paste layer in succession. Repeating the above mentioned procedure will yield a cell-sealed honeycomb fired body aggregate of prescribed size.

Also, when producing the cell-sealed honeycomb fired body aggregate, it is also acceptable to produce a cell-sealed honeycomb fired body aggregate by assembling in advance a plurality of cell-sealed honeycomb fired bodies by interposing spacers therebetween, and afterward pouring the sealing material paste into the spaces in between the cell-sealed honeycomb fired bodies.

It is possible to use a substance containing inorganic fiber and/or inorganic particle in addition to inorganic binder, organic binder, for example, as the above mentioned sealing material paste.

It is acceptable to use silica sol, alumina sol, and the like as the above mentioned inorganic binder. Also, it is acceptable to use the above singly, or use a combination of two or more of them in parallel. Of the above mentioned inorganic binders, silica sol is most preferable for use.

It is acceptable to use polyvinyl alcohol, methylcellulose, ethylcellulose, carboxy methylcellulose, and the like, for example, as the above mentioned organic binder. Also, it is acceptable to use the above singly, or use a combination of two or more of them in parallel. Of the above mentioned organic binders, carboxy methylcellulose is most preferable for use.

It is acceptable to use ceramic fibers such as silica-alumina, mullite, alumina and silica, for example, as the above mentioned inorganic fiber. Also, it is acceptable to use the above singly, or use a combination of two or more of them in parallel. Of the above mentioned inorganic fiber, alumina fiber is most preferable for use.

It is acceptable to use carbide, nitride, and the like, for example, as the above mentioned inorganic particle. More specifically, it is acceptable to use inorganic powder and the like comprised of silicon carbide, silicon nitride, boron nitride, or the like, for example, as the above mentioned inorganic particle. It is acceptable to use the above singly, or use a combination of two or more of them in parallel. Of the above mentioned inorganic particle, silicon carbide, which excels in its thermal conductivity properties, is most preferable for use.

And furthermore, it is also acceptable, according to need, to add a pore-forming agent such as balloon which is a micro sized hollow sphere, spherical acrylic granule, or graphite, having oxide based ceramic as a component therein, to the above mentioned sealing material paste.

The above mentioned balloon is not particularly limited, as alumina balloons, glass micro balloon, shirasu balloon, fly ash balloon (FA balloon), mullite balloon and the like, for example, are all acceptable for use. Of the above mentioned, alumina balloon is the most preferable for use.

Next, the cell-sealed honeycomb fired body aggregate is heated to dry the sealing material paste layer, which then hardens to become the sealing material layer (the adhesive layer).

Next, using a diamond cutter and the like, a cutting process is carried out on the honeycomb fired body aggregate comprising a plurality of cell-sealed honeycomb fired bodies bonded to one another by interposing the sealing material layer (adhesive layer), thereby producing a cylindrical ceramic block.

Afterward, another sealing material layer (a coat layer) is formed by forming the above mentioned sealing material paste to the outer periphery of the ceramic block. Thereby producing a honeycomb structured body having the sealing material layer (coat layer) formed on the outer peripheral portion of a cylindrical ceramic block comprising a plurality of cell-sealed honeycomb fired bodies bonded to one another by interposing the sealing material layer (adhesive layer).

Afterward, a catalyst is supported on the honeycomb structured body as needed. It is also acceptable to support the above mentioned catalyst onto the cell-sealed honeycomb fired bodies, before the cell-sealed honeycomb fired bodies are manufactured into the cell-sealed honeycomb fired body aggregate.

In a case where the catalyst is supported, it is preferable that a film of alumina, which has a high specific surface area, be formed onto the surface of the honeycomb structured body, and a co-catalyst or a catalyst such as platinum is applied to the surface of the alumina film.

It is acceptable to apply a method of impregnating the honeycomb structured body with a metallic compound containing an aluminum species such as $Al(NO_3)_3$, for example, and then heating, or a method of impregnating the honeycomb structured body with a solution containing alumina powder and then heating and other methods, as a method of forming the alumina film onto the surface of the above mentioned honeycomb structured body.

It is acceptable to apply a method of impregnating the honeycomb structured body with a metallic compound containing a rare earth element such as $Ce(NO_3)_3$, for example, and then heating, as a method of applying the co-catalyst onto the above mentioned alumina film.

It is acceptable to apply a method of impregnating the honeycomb structured body with a substance such as a dinitrodiammine platinum nitric acid solution ($[Ft\ (NH_3)_2 (NO_2)_2]HNO_3$, platinum content 4.53% by weight) and the like, for example, and then heating and other methods, as a method of applying the catalyst onto the above mentioned alumina film.

Also, it is acceptable to apply the catalyst with a method of first applying the catalyst to alumina particles in advance, and subsequently impregnating the honeycomb structured body with the solution containing the alumina powder, with the catalyst applied thereto in advance.

In the method for manufacturing a honeycomb structured body put forth up to this point, although description thereof has been of a method for manufacturing an aggregated honeycomb structured body having a constitution of a plurality of cell-sealed honeycomb fired bodies bound together by interposing the sealing material layer (adhesive layer), the honeycomb structured body manufactured according to the manufacturing method according to an embodiment of the present invention can also be an integral honeycomb structured body having a constitution of a cell-sealed honeycomb fired body of a single cylindrical ceramic block.

In a case of manufacturing an integral honeycomb structured body of this sort, the only aspect that is different than in a case of manufacturing the aggregated honeycomb structured body is that the size of the honeycomb molded body, that is extrusion molded, is larger than that in the case of manufacturing an aggregated honeycomb structured body, all other aspects used to manufacture an integral honeycomb structured body are identical to those used in manufacturing an aggregated honeycomb structured body. In this case also, the honeycomb molded body is produced by cutting the above-mentioned ceramic molded body with the molded body cutting apparatus.

Next, in the same manner as in the method for manufacturing an aggregated honeycomb structured body, using a drying apparatus such as a microwave drying machine, a hot air drying machine, a dielectric drying machine, a reduced pressure drying machine, a vacuum drying machine, or a freeze drying machine, the above mentioned honeycomb molded body is dried out.

Next, the cutting process is executed, cutting both of the end portions of the dried honeycomb molded body.

Next, cell sealing is carried out, and the end portions of the outlet sides of the inlet side cell group, as well as the end portions of the inlet sides of the outlet side cell group, are filled in with a prescribed amount of plug material paste.

After that, a drying treatment is carried out to the filled in plug material paste using a hot air drying apparatus or the like. And afterward, a flattening treatment is carried out to the end faces of the cell-sealed honeycomb molded body using the honeycomb molded body end face treating apparatus according to an embodiment of the present invention. Doing so makes it possible to obtain a honeycomb molded body having a flattened end face.

Afterward, in the same manner as in the manufacture of the aggregated honeycomb structured body, degreasing and firing are carried out, thereby producing a ceramic block. And as needed, a sealing material layer (coat layer) is formed, thereby manufacturing the integral honeycomb structured body. It is also acceptable to support a catalyst on the above mentioned integral honeycomb structured body as well, as is the method put forth herein above.

With the above explained method for manufacturing a honeycomb structured body it is possible to manufacture a honeycomb structured body with good operational efficiency.

Also, in a case of manufacturing a honeycomb structured body according to the above described method, since the end faces of the cell-sealed honeycomb molded body are flattened by the honeycomb molded body end face treating apparatus, it is possible to effectively maintain a degree of flatness on the end faces of the cell-sealed honeycomb fired body or the honeycomb structured body obtained through the subsequent firing treatment as well. And it is also possible to efficiently suppress changes in the shape of the end face as well as physical properties and the like that change in correspondence with the shape of the end face.

Moreover, since if the end portion of the plug material paste exists within a prescribed range pertaining to concavities or convexities of plug on the end face of the cell-sealed honeycomb fired body, it is possible to effectively maintain flatness on the end faces of the honeycomb structured body. Because of this, it is possible to obtain a constant external appearance, and also, when situating the honeycomb structured body inside of a casing for the purpose of using the honeycomb structured body as an exhaust gas purifying filter, it is possible to prevent cracking and the like from occurring on the end face which would be caused by the end face making contact with the casing.

The description in the above mainly discusses the honeycomb structured body according to an embodiment of the present invention, by taking a honeycomb structured body which can be suitably used as a honeycomb filter for capturing particulates in exhaust gases as an example. However, in the honeycomb structured body according to an embodiment of the present invention, the honeycomb structured body may be manufactured without being filled with a plug material paste as mentioned above, and the honeycomb structured body in which the end portion of the cells is not sealed with the plug may be suitably used as a catalyst supporting carrier, and such a honeycomb structured body may exert the same effects as those of a honeycomb structured body used as a honeycomb filter.

EXAMPLES

Hereinbelow examples will be set forth describing embodiments of the present invention in further detail, though it should be understood that the present invention is not limited to these examples.

Example 1

α-type silicon carbide powder having an average particle diameter of 10 μm (250 kg), α-type silicon carbide powder having an average particle diameter of 0.5 μm (100 kg), and organic binder (methylcellulose) (20 kg) were blended together to prepare a powder mixture.

Next, 12 kg of lubricating agent (UNILUB, manufactured by NOF Corp.), 5 kg of plasticizer (glycerin), and 65 kg of water were blended in a separate container to prepare a liquid mixture. Next, using a wet mixing machine, the powder mixture and the liquid mixture were blended together, thereby preparing the moist mixture.

And the moisture content of the moist mixture prepared here was 14% by weight.

Next, using a conveyer apparatus the moist mixture was conveyed to the extrusion molding machine where it was inducted into a raw material induction port of the extrusion molding machine.

And the moisture content of the moist mixture at just before its induction into the extrusion molding machine was 13.5% by weight.

Then, a honeycomb molded body was produced by extrusion molding of this moist mixture, and subsequent cutting of the extruded molded body. Afterward, the above mentioned honeycomb molded body was dried using a microwave drying apparatus.

Next, using the honeycomb molded body opening-sealing apparatus having the constitution shown in FIG. 6 and FIGS. 7(a) and 7(b), a plug material paste having the same composition as the above mentioned honeycomb molded body was filled into prescribed cells. Here, the specifications of the constituent members of the honeycomb molded body opening-sealing apparatus were as follows.

Plug material paste temperature: 70 Degrees Celsius (inside of the paste dispenser tank)

Plug material paste viscosity: 42 Pa·s (at time of preparation, measured temperature: 25 Degrees Celsius)

Uniaxial screw pump: Robo-dispenser 3NDPL06G15, manufactured by Heishin Ltd.

Plug material paste dispensing time: 1.6 seconds

Plug material paste filling amount: 5 g/each face

Next, the cell-sealed honeycomb molded body that has been filled with plug material paste was inducted into the hot air drying apparatus shown in FIGS. 9(a) and 9(b), where the plug material paste was dried by blowing hot air to the end face of the honeycomb molded body. The specifications of the hot air drying apparatus were as follows.

Belt conveyer length: 2.6 m

Hot air temperature: 190 Degrees Celsius

Hot air blowing time: 3.7 minutes

The above mentioned time period of blowing the hot air is adjusted by the movement speed of the belt conveyer which is configured to move continuously at a constant rate of speed. The movement speed of the belt conveyer was 0.7 m/min.

Afterward, both end faces of the cell-sealed honeycomb molded body were flattened using the honeycomb molded body end face treating apparatus according to an embodiment of the present invention.

More specifically, in the honeycomb molded body end face treating apparatus 10 shown in FIGS. 1-1 and 1-2, the cell-sealed honeycomb molded body was conveyed to the central portion of the honeycomb molded body end face treating apparatus by the induction conveyer 11 where it was placed on the molded body placement platform 17 by the transport arm 12. After that, the first flat plate movement mechanism 21 was driven to press the two flat plates 20, the press faces of which had a surface roughness Ra of 0.04 μm, against both end faces of the cell-sealed honeycomb molded body 1 at a weight of 29.4N (3 kgf) for 2.0 seconds, at which time the second flat plate movement mechanism 22 was driven to rotate the two flat plates 20, which were in a state of being pressed against the end faces, 45° to thereby flatten both end faces. Next, the flat plates 20 were retracted, at which time the cell-sealed honeycomb molded body 1 was conveyed to the carrying-out conveyer 14 by the transport arm 12 while material adhering to the flat plates was removed by a rotary brush employed into use as the adhered material removal mechanism, thus completing a sequence of the end face treatment.

Degreasing was carried out at 400 Degrees Celsius to the cell-sealed honeycomb molded body that has passed through the end face treatment, and then firing was carried out for three hours at atmospheric pressure in an argon atmosphere at 2200 Degrees Celsius, thereby producing a cell-sealed honeycomb fired body made from a silicon carbide sintered body having a porosity of 40%, an average pore diameter of 12.5 μm, dimensions of 34.3 mm×34.3 mm×150 mm, with a number of cells (cell density) of 46.5 pcs/cm$^2$, and a cell wall thickness of 0.20 mm. The above mentioned procedure was repeated to produce 1000 pcs of cell-sealed honeycomb fired bodies.

Example 2

Aside from a point of the rotational angle at which the flat plate 20, in a state of being pressed up against an end face, is rotated by driving the second flat plate movement mechanism 22 was set to 10°, 1000 pcs of cell-sealed honeycomb fired bodies were produced in the same manner as in the Example 1.

Example 3

Aside from a point of having used the honeycomb molded body end face treating apparatus 10 which has the flat plate(s) 20 with a press face surface roughness Ra of 0.14 μm, to carry out the end face treatment, 1000 pcs of cell-sealed honeycomb fired bodies were produced in the same manner as in the Example 1.

Example 4

Aside from a point of having used the honeycomb molded body end face treating apparatus 10 which has the flat plate(s) 20 with a press face surface roughness Ra of 1.3 μm, to carry out the end face treatment, 1000 pcs of cell-sealed honeycomb fired bodies were produced in the same manner as in the Example 1.

Example 5

Aside from a point of having used the honeycomb molded body end face treating apparatus 10 which has the flat plate(s) 20 with a press face surface roughness Ra of 4.0 μm, to carry out the end face treatment, 1000 pcs of cell-sealed honeycomb fired bodies were produced in the same manner as in the Example 1.

Example 6

Aside from a point of having carried out end face treatment with the weight at which the flat plate 20 is pressed up against the end face of the cell-sealed honeycomb molded body 1 having been set to 9.8N (1 kgf), 1000 pcs of cell-sealed honeycomb fired bodies were produced in the same manner as in the Example 1.

Example 7

Aside from a point of having carried out end face treatment with the weight at which the flat plate 20 is pressed up against the end face of the cell-sealed honeycomb molded body 1 having been set to 49.0N (5 kgf), 1000 pcs of cell-sealed honeycomb fired bodies were produced in the same manner as in the Example 1.

Example 8

Aside from a point of the rotational angle at which the flat plate 20, in a state of being pressed up against an end face, is rotated by driving the second flat plate movement mechanism 22 having been set to 90°, 1000 pcs of cell-sealed honeycomb fired bodies were produced in the same manner as in the Example 1.

Example 9

Aside from a point of the rotational angle at which the flat plate 20, in a state of being pressed up against an end face, is rotated by driving the second flat plate movement mechanism 22 having been set to 150°, 1000 pcs of cell-sealed honeycomb fired bodies were produced in the same manner as in the Example 1.

Reference Example 1

Aside from a point of not having carried out removal by the rotary brush of the material adhering to the flat plate 20 after having carried out the end face treatment, 1000 pcs of cell-sealed honeycomb fired bodies were produced in the same manner as in the Example 1.

Reference Example 2

Aside from a point of having used the honeycomb molded body end face treating apparatus 10 which has the flat plate(s) 20 with a press face surface roughness Ra of 8.0 μm, to carry out the end face treatment, 1000 pcs of cell-sealed honeycomb fired bodies were produced in the same manner as in the Example 1.

Reference Example 3

Aside from a point of the not having had driven the second flat plate movement mechanism 22 to thereby not rotate the flat plate 20 in a state of being pressed up against an end face, 1000 pcs of cell-sealed honeycomb fired bodies were produced in the same manner as in the Example 1.

Reference Example 4

Aside from a point of the rotational angle at which the flat plate 20, in a state of being pressed up against an end face, is rotated according to driving the second flat plate movement mechanism 22 having been set to 180°, 1000 pcs of cell-sealed honeycomb molded bodies were produced in the same manner as in the Example 1.

Reference Example 5

Aside from a point of having carried out end face treatment with the weight at which the flat plate 20 is pressed up against the end face of the cell-sealed honeycomb molded body 1 having been set to 4.9N (0.5 kgf), 1000 pcs of cell-sealed honeycomb fired bodies were produced in the same manner as in the Example 1.

Reference Example 6

Aside from a point of having carried out end face treatment with the weight at which the flat plate 20 is pressed up against the end face of the cell-sealed honeycomb molded body 1 having been set to 98.0N (10 kgf), 1000 pcs of cell-sealed honeycomb fired bodies were produced in the same manner as in the Example 1.

Comparative Example 1

Aside from a point of having produced cell-sealed honeycomb fired bodies by filling plug material paste into honeycomb molded bodies, carrying out drying of the end faces afterward, yet not having carried out the end face treatment using the honeycomb molded body end face treating apparatus, 1000 pcs of cell-sealed honeycomb fired bodies were produced in the same manner as in the Example 1.

(Evaluation of Occurrence Rate of End Face Cracking)

By carrying out visual observation of the end faces of the cell-sealed honeycomb fired body, it was determined whether or not cracking had occurred in each of the cell-sealed honeycomb fired bodies produced in Examples 1 through 9, Reference Examples 1 through 6, and Comparative Example 1. The proportion of cell-sealed honeycomb fired bodies in which cracking had occurred out of all produced cell-sealed honeycomb fired bodies was calculated as 'cracking occurrence rate (%).' The results of which are displayed in Table 1.

(Evaluation of Presence or Absence of Adhered Material on End Face)

By carrying out visual observation of the end faces of the cell-sealed honeycomb fired body, it was determined whether adhered material was present or absent on both end faces on each of the cell-sealed honeycomb fired bodies produced in Examples 1 through 9, Reference Examples 1 through 6, and Comparative Example 1. The results of which are displayed in Table 1.

(Evaluation of State (Peeling of Plug) of End Face)

By carrying out visual observation of the end faces of the cell-sealed honeycomb fired body, it was determined whether the plug had underwent peeling on the cell-sealed honeycomb fired bodies produced in Examples 1 through 9, Reference Examples 1 through 6, and Comparative Example 1. The results of which are displayed in Table 1.

(Measurement of Protruded Amount or Recessed Amount of Plug Material Paste from End Face)

After using a diamond cutter to cut the cell-sealed honeycomb fired bodies produced in Examples 1 through 9, Reference Examples 1 through 6, and Comparative Example 1 in a direction parallel to the longitudinal direction of the cell-sealed honeycomb fired body to thereby expose a cut face of the sort shown in FIG. 5(*b*), the cut faces were polished with sandpaper, and then the protruded amount or the recessed amount of the plug material paste on both end faces was measured using a factory microscope TMM (Manufactured by TOPCON CORPORATION). The results of which are displayed in Table 1.

TABLE 1

| | Rotational angle of flat plate [°] | Removal of adhered material on flat plate | Surface roughness of flat plate press face [Ra: μm] | Press weight of flat plate against end face [N] | Cracking occurrence rate [%] | Presence or absence of adhered material | End face state (peeling of plug) | Protruded amount or recessed amount [mm] |
|---|---|---|---|---|---|---|---|---|
| Example 1 | 45 | Removed | 0.04 | 29.4 | 0 | Absent | Not peeled | 0 |
| Example 2 | 10 | Removed | 0.04 | 29.4 | 0 | Absent | Peeled a negligible amount | −0.3 |
| Example 3 | 45 | Removed | 0.14 | 29.4 | 0.2 | Absent | Not peeled | 0 |
| Example 4 | 45 | Removed | 1.30 | 29.4 | 0.5 | Absent | Not peeled | 0 |
| Example 5 | 45 | Removed | 4.00 | 29.4 | 0.7 | Absent | Not peeled | 0 |
| Example 6 | 45 | Removed | 0.04 | 9.8 | 0 | Absent | Not peeled | 0 |
| Example 7 | 45 | Removed | 0.04 | 49.0 | 0 | Absent | Not peeled | 0 |
| Example 8 | 90 | Removed | 0.04 | 29.4 | 0.5 | Absent | Not peeled | 0 |
| Example 9 | 150 | Removed | 0.04 | 29.4 | 0.6 | Absent | Not peeled | 0 |
| Reference Example 1 | 45 | Not removed | 0.04 | 29.4 | 1.1 | Present | Not peeled | 0 |
| Reference Example 2 | 45 | Removed | 8.00 | 29.4 | 1.3 | Absent | Not peeled | 0 |
| Reference Example 3 | 0 | Removed | 0.04 | 29.4 | 0 | Absent | Peeled | −0.5 |
| Reference Example 4 | 180 | Removed | 0.04 | 29.4 | 1.4 | Absent | Not peeled | 0 |
| Reference Example 5 | 45 | Removed | 0.04 | 4.9 | 0 | Absent | Not peeled | 0.5 |

TABLE 1-continued

|  | Rotational angle of flat plate [°] | Removal of adhered material on flat plate | Surface roughness of flat plate press face [Ra: μm] | Press weight of flat plate against end face [N] | Cracking occurrence rate [%] | Presence or absence of adhered material | End face state (peeling of plug) | Protruded amount or recessed amount [mm] |
|---|---|---|---|---|---|---|---|---|
| Reference Example 6 | 45 | Removed | 0.04 | 98.0 | 2.2 | Absent | Not peeled | 0 |
| Comparative Example 1 | n/a | n/a | n/a | n/a | 0 | n/a | Not peeled | 1.0 |

As can be clearly seen from Table 1, in the cell-sealed honeycomb fired bodies produced in Examples 1 through 9, Reference Examples 1 through 6, the protruded amount or recessed amount of the plug material paste on the end face of all cell-sealed honeycomb fired bodies was 0.5 mm or less and a flat end face was obtained. On the other hand, in the cell-sealed honeycomb fired bodies produced in the Comparative Example 1, the plug material paste on the end faces had a protruded amount of 1.0 mm, a value at which the end faces cannot be deemed 'flat' in any way. This is thought to have been caused by protruded plugs having been left in their protruding state due to the absence of flattening treatment.

Also, in the cell-sealed honeycomb fired bodies produced in Examples 1 through 9, the occurrence rate of cracking was a low rate of 0.7% or less, there was no presence of adhered material, and peeling of the plug of the end faces was either absent or present at a negligible amount.

Moreover, in the cell-sealed honeycomb fired bodies produced in Examples 1 through 9, the protruded amount or the recessed amount of the plug material paste of the end faces thereof was 0 mm, or the recessed amount was 0.3 mm. Thus these were cell-sealed honeycomb fired bodies having end faces of an extremely high degree of flatness.

From the above results it can be understood that it is possible to obtain a cell-sealed honeycomb fired body having a flat end face by carrying out end face treatment of pressing the flat plate against the end faces of the cell-sealed honeycomb molded body. In particular, it is understood that it is possible to assuredly obtain a cell-sealed honeycomb fired body having end faces of an extremely high degree of flatness by using flat plate(s) having a press face surface roughness Ra in the range of 0.04 to 4.0 μm, pressing such a flat plate against the end faces of the cell-sealed honeycomb molded body at a weight in the range of 9.8 to 49N (1 to 5 kgf), rotating the flat plate at an angle of rotation at between 45 o and 90 o while the flat plate is in a state of being pressed against the end face of the cell-sealed honeycomb molded body, and removing material adhering to the flat plate after having carried out the end face treatment.

According to the honeycomb molded body end face treating apparatus according to an embodiment of the present invention, since a flat plate, which is disposed so as to face an end face of the cell-sealed honeycomb molded body having its cells sealed in a parallel manner, is pressed against the above mentioned end face, it is possible to effectively and efficiently flatten the entirety of the end face (encompassing both the cell wall and the plug material paste for sealing the cells).

Also, since cells are sealed with a plug material paste and flattening of the end face is carried out using the above mentioned flat plate after having carried out drying, it is possible, even if the plug material paste is protruding from the cells after the drying of the plug material paste, to mend or repair protruding plug material paste thereby effectively carry out flattening of the end face.

When the honeycomb molded body end face treating apparatus includes the adhered material removal mechanism, since material adhering to flat plate at the time when the flat plate is pressed against the end face of the above mentioned honeycomb molded body is removed from the flat plate with each press operation of the flat plate, the material adheres to the end face of the honeycomb molded body during the next press operation and thereby does not hinder flattening, thus making it possible to carry out flattening treatment efficiently.

By using a flat plate having a prescribed surface roughness, or by pressing the flat plate against the end face at a prescribed weight, it is possible to carry out flattening of the end face of the honeycomb molded body in an efficient manner. Also, by pressing a flat plate having a prescribed surface roughness against the end face at a prescribed weight, it is possible to carry out flattening of the end face of the honeycomb molded body at an even higher degree of efficiency.

When the honeycomb molded body end face treating apparatus according to an embodiment of the present invention is provided with two flat plates and each of the above mentioned two flat plates is pressed against respective end faces at both ends of the cell-sealed honeycomb molded body, it is possible to carry out flattening of both end faces of the cell-sealed honeycomb molded body with a single flat plate press operation, and thereby carry out flattening treatment in an even more efficient manner.

In the sealing method of a honeycomb molded body according to an embodiment of the present invention since flattening of the end face is carried out using the honeycomb molded body end face treating apparatus according to an embodiment of the present invention, it is possible to carry out flattening of the end face of the cell-sealed honeycomb molded body at a high degree of precision and in an efficient manner.

According to the method for manufacturing a honeycomb structured body according to an embodiment of the present invention, since flattening is carried out to a cell-sealed honeycomb molded body having its cells sealed with a plug material paste, it is possible to effectively maintain a degree of flatness, as well as efficiently suppress changes in the shape, or the physical properties and the like prone to change in correspondence to the shape of end face, in the end faces of also a honeycomb structured body obtained through the subsequent firing treatment.

According to the method for manufacturing a honeycomb structured body according to an embodiment of the present invention, with respect to plug concavities or convexities on the end face of the cell-sealed honeycomb fired body, since if the end portions of the plug exist within a prescribed region, it is possible to effectively maintain a degree of flatness on the end face of the honeycomb structured body as well, thereby it is possible to obtain a prescribed external appearance. Also, when a honeycomb structured body is situated inside of a casing in order to be used as an exhaust gas purifying filter, it is possible to effectively prevent the occurrence of cracking and the like of the end face when the end face and the casing make contact.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A sealing method of a honeycomb molded body comprising:
   filling a plug material paste into either a first end or a second end of each of a plurality of cells of a honeycomb molded body which has a first end portion and a second end portion in a longitudinal direction of the honeycomb molded body, the plurality of cells each extending along the longitudinal direction from said first end at the first end portion to said second end at the second end portion;
   drying said plug material paste;
   supporting the honeycomb molded body having dried plug material paste;
   providing at least one flat plate movable along the longitudinal direction and having a flat surface substantially perpendicular to the longitudinal direction to face either one of the first and second end portions;
   moving the at least one flat plate along the longitudinal direction to directly contact with the either one of the first and second end portions so as to flatten the first end portion and the second end portion; and
   rotating said at least one flat plate in a plane substantially perpendicular to the longitudinal direction keeping the flat surface of the at least one flat plate in direct contact with the either one of the first and second end portions.

2. The sealing method of a honeycomb molded body according to claim 1, further comprising:
   removing material adhering to the flat surface of said at least one flat plate.

3. The sealing method of a honeycomb molded body according to claim 1,
   wherein the flat surface of said at least one flat plate has a surface roughness Ra of at least about 0.04 μm and at most about 4.0 μm.

4. The sealing method of a honeycomb molded body according to claim 1,
   wherein a force of at least about 9.8N and at most about 49N is applied to said at least one flat plate to press the either one of the first and second end portions.

5. The sealing method of a honeycomb molded body according to claim 1,
   wherein a distance between a flattened plane surface comprising either the first and second end portions and a most protruded portion or a most recessed portion of said plug material paste with respect to said either the first and second end portions is at most about 1 mm.

6. The sealing method of a honeycomb molded body according to claim 1,
   wherein a first flat plate and a second flat plate are provided, and
   wherein said first and second flat plates are moved along the longitudinal direction to directly contact with the first and second end portions, respectively.

7. The sealing method of a honeycomb molded body according to claim 1, wherein the at least one flat plate is moved along the longitudinal direction to directly contact with cell walls of the plurality of cells of either one of the first and second end portions, and wherein said at least one flat plate is rotated in the plane substantially perpendicular to the longitudinal direction keeping the flat surface of the at least one flat plate in direct contact with the cell walls of either one of the first and second end portions.

8. The sealing method of a honeycomb molded body according to claim 1,
   wherein said plug material paste is dried using a hot air drying apparatus.

9. A method for manufacturing a cell-sealed honeycomb fired body, the method comprising:
   forming a honeycomb molded body which has a first end portion and a second end portion in a longitudinal direction of the honeycomb molded body and which includes a plurality of cells each extending along the longitudinal direction from a first end at the first end portion to a second end at the second end portion;
   filling a plug material paste into either the first end or the second end of each of said plurality of cells to form a cell-sealed honeycomb molded body;
   drying said plug material paste;
   supporting the cell-sealed honeycomb molded body having dried plug material paste;
   providing at least one flat plate movable along the longitudinal direction and having a flat surface substantially perpendicular to the longitudinal direction to face either one of the first and second end portions;
   moving the at least one flat plate along the longitudinal direction to directly contact with the either one of the first and second end portions so as to flatten the first end portion and the second end portion;
   firing said cell-sealed honeycomb molded body to produce the cell-sealed honeycomb fired body; and
   rotating said at least one flat plate in a plane substantially perpendicular to the longitudinal direction keeping the flat surface of the at least one flat plate in direct contact with the either one of the first and second end portions.

10. The method according to claim 9, further comprising:
    removing material adhering to the flat surface of said at least one flat plate.

11. The method according to claim 9, wherein the flat surface of said at least one flat plate has a surface roughness Ra of at least about 0.04 μm and at most about 4.0 μm.

12. The method according to claim 9, wherein a force of at least about 9.8N and at most about 49N is applied to said at least one flat plate to press the either one of the first and second end portions.

13. The method according to claim 9, wherein a distance between a flattened plane surface comprising either the first and second end portions of said cell-sealed honeycomb molded body and a most protruded portion or a most recessed portion of said plug material paste with respect to said either the first and second end portions is at most about 1 mm.

14. The method according to claim 9, wherein a distance between a plane surface comprising either the first and second end portions of said cell-sealed honeycomb fired body and a most protruded portion or a most recessed portion of said plug material paste with respect to said either the first and second end portions is at most about 1 mm.

15. The method according to claim 9,
    wherein a first flat plate and a second flat plate are provided, and wherein said first and second flat plates are moved along the longitudinal direction to directly contact with the first and second end portions, respectively.

16. The method according to claim 9, wherein the at least one flat plate is moved along the longitudinal direction to directly contact with cell walls of the plurality of cells of either one of the first and second end portions, and wherein said at least one flat plate is rotated in the plane substantially perpendicular to the longitudinal direction keeping the flat surface of the at least one flat plate in direct contact with the cell walls of either one of the first and second end portions.

17. The method according to claim 9,
wherein said plug material paste is dried using a hot air drying apparatus.

* * * * *